(12) United States Patent
Frank et al.

(10) Patent No.: US 8,402,022 B2
(45) Date of Patent: Mar. 19, 2013

(54) CONVERGENCE OF TERMS WITHIN A COLLABORATIVE TAGGING ENVIRONMENT

(76) Inventors: Martin R. Frank, Bainbridge Island, WA (US); Walter Manching Tseng, Seattle, WA (US)

( * ) Notice: Subject to any disclaimer, the term of this patent is extended or adjusted under 35 U.S.C. 154(b) by 1159 days.

(21) Appl. No.: 11/537,218

(22) Filed: Sep. 29, 2006

(65) Prior Publication Data

US 2008/0114644 A1  May 15, 2008

Related U.S. Application Data

(63) Continuation-in-part of application No. 11/276,539, filed on Mar. 3, 2006, now Pat. No. 8,112,324.

(51) Int. Cl.
*G06F 17/30* (2006.01)
*G06F 17/28* (2006.01)
*G06F 17/00* (2006.01)

(52) U.S. Cl. ........ 707/727; 707/688; 707/708; 707/706; 707/750; 707/726; 704/4; 704/10; 715/256; 715/259

(58) Field of Classification Search ................. 707/608, 707/609, 705–709, 726–732, 748–754, 783, 707/688; 715/205–209, 233–237, 751, 256, 715/259; 705/26–27; 709/203–204, 215–220; 706/45–50; 704/4, 10
See application file for complete search history.

(56) References Cited

U.S. PATENT DOCUMENTS

| | | | |
|---|---|---|---|
| 5,642,518 A * | 6/1997 | Kiyama et al. .................... 704/7 | |
| 5,740,425 A | 4/1998 | Povilus | |
| 6,041,311 A * | 3/2000 | Chislenko et al. .............. 705/27 | |
| 6,266,664 B1 * | 7/2001 | Russell-Falla et al. ....... 707/700 | |
| 6,385,611 B1 * | 5/2002 | Cardona ............................... 1/1 | |
| 6,912,525 B1 * | 6/2005 | Chipalkatti et al. ................. 1/1 | |
| 7,100,199 B2 | 8/2006 | Ginter et al. | |
| 7,117,262 B2 | 10/2006 | Bai et al. | |
| 7,197,475 B1 | 3/2007 | Lorenzen et al. | |
| 7,668,821 B1 | 2/2010 | Donsbach et al. | |
| 8,131,735 B2 * | 3/2012 | Rose et al. ..................... 707/750 | |
| 2001/0047297 A1 | 11/2001 | Wen | |
| 2002/0007309 A1 | 1/2002 | Reynar | |
| 2002/0013792 A1 * | 1/2002 | Imielinski et al. ............ 707/523 | |
| 2002/0024532 A1 * | 2/2002 | Fables et al. .................. 345/700 | |
| 2002/0059272 A1 | 5/2002 | Porter | |
| 2002/0076674 A1 | 6/2002 | Kaplan | |
| 2002/0111146 A1 | 8/2002 | Fridman et al. | |

(Continued)

FOREIGN PATENT DOCUMENTS

| JP | 2001101203 | 4/2001 |
|---|---|---|
| JP | 2002358327 | 12/2002 |

(Continued)

OTHER PUBLICATIONS

U. Roy et al. "Collaborative product conceptualization tool using web technology",Computers in Industry 41_2000.195-209.*

(Continued)

*Primary Examiner* — Srirama Channavajjala
(74) *Attorney, Agent, or Firm* — Lee & Hayes, PLLC

(57) ABSTRACT

Tools and techniques for converging terms within a collaborative tagging environment are described herein. Methods for converging divergent contributions to the collaborative tagging environment may include receiving respective contributions from users within the environment. The methods may identify at least some of the contributions as divergent, and enable the users to converge the divergent contributions.

31 Claims, 13 Drawing Sheets

U.S. PATENT DOCUMENTS

| | | | |
|---|---|---|---|
| 2002/0120504 | A1 | 8/2002 | Gould et al. |
| 2002/0143659 | A1 | 10/2002 | Keezer et al. |
| 2002/0143742 | A1 | 10/2002 | Nonomura et al. |
| 2002/0147625 | A1 | 10/2002 | Kolke, Jr. |
| 2002/0173972 | A1 | 11/2002 | Daniel et al. |
| 2002/0174059 | A1 | 11/2002 | Guo |
| 2002/0184108 | A1 | 12/2002 | Hatakama et al. |
| 2002/0198933 | A1 | 12/2002 | Kwak |
| 2003/0041108 | A1* | 2/2003 | Henrick et al. ............... 709/205 |
| 2003/0055725 | A1 | 3/2003 | Lee |
| 2003/0056222 | A1 | 3/2003 | Iwata et al. |
| 2003/0074190 | A1* | 4/2003 | Allison ............................ 704/10 |
| 2003/0182310 | A1 | 9/2003 | Charnock et al. |
| 2004/0193506 | A1* | 9/2004 | Zmolek ............................ 705/27 |
| 2004/0243388 | A1* | 12/2004 | Corman et al. ................... 704/1 |
| 2005/0021490 | A1* | 1/2005 | Chen et al. ........................ 707/1 |
| 2005/0055306 | A1* | 3/2005 | Miller et al. ..................... 705/37 |
| 2005/0065856 | A1* | 3/2005 | Roberts et al. .................. 705/26 |
| 2005/0114357 | A1* | 5/2005 | Chengalvarayan et al. .. 707/100 |
| 2005/0114789 | A1* | 5/2005 | Chang et al. ................... 715/779 |
| 2005/0193010 | A1 | 9/2005 | DeShan et al. |
| 2005/0198026 | A1* | 9/2005 | Dehlinger et al. ................ 707/5 |
| 2005/0203807 | A1 | 9/2005 | Bezos et al. |
| 2005/0210392 | A1 | 9/2005 | Koide et al. |
| 2005/0251384 | A1* | 11/2005 | Yang ............................... 704/10 |
| 2005/0256787 | A1 | 11/2005 | Wadawadigi et al. |
| 2006/0031263 | A1 | 2/2006 | Arrouye et al. |
| 2006/0041548 | A1 | 2/2006 | Parsons et al. |
| 2006/0041553 | A1* | 2/2006 | Paczkowski et al. ............. 707/7 |
| 2006/0190355 | A1 | 8/2006 | Jammes et al. |
| 2006/0282304 | A1* | 12/2006 | Bedard et al. ................... 705/10 |
| 2007/0033092 | A1* | 2/2007 | Iams ................................. 705/10 |
| 2007/0043742 | A1* | 2/2007 | Arguello et al. .............. 707/100 |
| 2007/0078832 | A1 | 4/2007 | Ott et al. |
| 2007/0168179 | A1* | 7/2007 | Markanthony et al. ........... 704/4 |
| 2007/0174247 | A1 | 7/2007 | Xu et al. |
| 2007/0208679 | A1 | 9/2007 | Tseng et al. |
| 2007/0226077 | A1 | 9/2007 | Frank et al. |
| 2007/0244756 | A1 | 10/2007 | Stucki |
| 2008/0082416 | A1 | 4/2008 | Kotas et al. |
| 2008/0091548 | A1 | 4/2008 | Kotas et al. |
| 2010/0153364 | A1* | 6/2010 | Kirby ............................ 707/722 |
| 2010/0211463 | A1* | 8/2010 | Black et al. ................ 705/14.52 |

FOREIGN PATENT DOCUMENTS

| | | | |
|---|---|---|---|
| JP | 2004046620 | | 2/2004 |
| WO | WO 03/019418 | * | 3/2002 |

OTHER PUBLICATIONS

Jonathan Grudin "Trends in Collaborative Technologies for Supporting Knowledge Management", 2005 IEEE, pp. 5.*

Pascale Fung, "Domain Word Translation by Space-Frequency Analysis of Context Length Histograms", 1996 IEEE, 184-187.*

Stewart, "The ABC's of Co-Ops", 18th Annual Ohio Employee Ownership Conference, Akron, OH, Apr. 16, 2004, 10 pages.

U.S. Appl. No. 11/615,851, filed Dec. 22, 2006, Paul A. Kotas and Joseph C. Park, "Community-Based Selection of Online Advertisements".

Battelle, John "Base.Google.com (Or..All Your Base Are Belong to Google)", retrieved on Nov. 3, 2005 at <<http://battellemedia.com/archives/001960.php>>, 8 pgs.

"Google Base—Google Search", retrieved on Nov. 3, 2005 at <<http://www.google.com/search?q=Google+Base>>, 2 pgs.

"Google Base on Flickr—Photo Sharing!", retrieved on Nov. 3, 2005 at <<http://www.flickr.com/photos/dirson/55908013>>, 5 pgs.

"Google Base Was Sort of Live", retrieved on Mar. 1, 2006 at <<http://blog.outer-court.com/archive/2005-10-25-n57.html>>, 2 pgs.

Guan et al., "Intelligent Product Brokering for E-commerce: An Incremental Approach to Unaccounted Attribute Detection", Elsevier, Electonic Commerce Research and Applications 3, 2004, pp. 232-252.

Hof, Robert et al., "Big Waves from 'Google Base'", retrieved on Mar. 1, 2006 at <<http://www.businessweek.com/technology/contect/oct2005/tc20051027_587849>>, 4 pgs.

PCT International Search Report from PCT/US 07/79733, mailed Mar. 27, 2008, which is a counterpart of the instant application, 3 pages.

Etsy, "Etsy: Your place to buy and sell all things handmade" retrieved on May 4, 2010 at <<http://www.etsy.com/>> 8 pages.

Linden, et al., "Amazon.com Recommendations: Item-to-Item Collaborative Filtering", Feb. 2003, 5 pages.

Beilenberg et al., "Groups in Social Software: Utilizing Tagging to Integrate Individual Contexts for Social Navigation", Master Thesis submitted Aug. 16, 2005, Bremen University, Bremen, Germany, 120 pages.

Non-Final Office Action for U.S. Appl. No. 11/276,539, mailed on Jul. 8, 2011, Martin R. Frank, "Collaborative Structured Tagging for Item Encyclopedias" 21 pages.

Translated Chinese Office Action mailed Oct. 28, 2011 for Chinese patent application No. 200780007501.0, a counterpart foreign application of U.S. Appl. No. 11/276,539, 9 pages.

Translated Chinese Office Action mailed Sep. 7, 2011 for Chinese patent application No. 200780007486.X, a counterpart foreign application of U.S. Appl. No. 11/537,446, 9 pages.

Choy, "Web Information Retrieval in Collaborative Tagging Systems", ACM, 2 Pen Plaza, Suite 701, New York, USA, 2006, 4 pages.

Extended European Search Report mailed Mar. 16, 2012 for European patent application No. 07757817.7, 7 pages.

Chinese Office Action mailed Apr. 1, 2012 for Chinese patent application No. 200780007501.0, a counterpart foreign application of US patent No. 8,112,324, 10 pages.

Non-Final Office Action for U.S. Appl. No. 11/537,218, mailed on Apr. 30, 2012, Martin R. Frank et al., "Convergence of Terms Within a Collaborative Tagging Environment", 47 pages.

Suzuki, "Follow process of forming original idea and technique into tools! How to you create the site?", Web Designing, vol. 5, No. 10, Mynavi Corporation, Japan, Oct. 1, 2005, pp. 72-73.

Translated Japanese Office Action mailed Apr. 27, 2012 for Japanese patent application No. 2008-558481, a counterpart foreign application of US patent No. 8,103,614, 6 pages.

Japanese Office Action mailed May 2, 2012 for Japanese patent application No. 2008-558480, a counterpart foriegn application of US patent No. 8,112,324, 8 pages.

Translated Chinese Office Action mailed Jun. 26, 2012 for Chinese patent application No. 200780007486.X, a counterpart foreign application of US patent No. 8,103,614, 10 pages.

* cited by examiner

CONVERGENCE OF TERMS WITHIN A COLLABORATIVE TAGGING ENVIRONMENT

CROSS REFERENCE TO RELATED APPLICATION

This application is a continuation-in-part of patent application Ser. No. 11/276,539, filed on 3 Mar. 2006 now U.S. Pat. No. 8,112,324, for "Collaborative Structured Tagging for Item Encyclopedias." The contents of this patent are incorporated by this reference as if set forth verbatim herein, and the benefit of the filing date of this patent is claimed to the fullest extent permitted under 35 U.S.C. §120.

BACKGROUND

Companies often face unique problems when trying to sell products over the Internet. Unlike traditional brick-and-mortar businesses, e-commerce companies do not have a physical store or location where a salesperson can help both novice and knowledgeable customers find sought after products. In the web environment, it is the customer's responsibility to identify a product that meets his or her needs. Even customers with considerable experience navigating e-commerce websites sometimes find it difficult to locate a desired product from among hundreds or thousands of offered products. For novice customers, the task of shopping online via the web can be unproductive and even frustrating.

Companies with e-commerce websites continue to look for ways to make their websites more dynamic, compelling, and easier for users to navigate and locate products. Today, e-commerce websites commonly serve pages with rich images of products and corresponding product descriptions. Unfortunately, there is little consistency among the many ways that products can be described. Product descriptions are often left to the manufacturer or distributor of the products, and hence, the terms and attributes used to describe those products are typically not uniform. For instance, different manufacturers or retailers of digital cameras may characterize zoom attributes or image capture modes in any number of different ways. This non-uniformity can make it difficult for users to locate products, compare similar products, or understand the differentiating features when considering a purchase decision.

Moreover, finding a particular product or set of similar products on a website can be challenging, especially for websites offering a very large number of products. Many websites offer search mechanisms (e.g., such as keyword search engines) that allow users to input descriptive terms for items of interest. Regrettably, due in part to the inconsistency of how the products are initially defined, it is not uncommon for search mechanisms to return one of two extremes: (1) zero product hits or (2) hundreds of product hits with varying degrees of relevance. In the case of many product hits, it is up to the customer to sort through the results, which can be unproductive and annoying.

One way of making product search simpler and more robust is through further advancing textual search technology. However, this approach inherently burdens the searching customer with the task of identifying comparable products among the search results, and with the task of then extracting and normalizing the values of the most important product attributes. Another approach to improve searchability is to improve consistency in the product descriptions by asking manufactures and merchants to describe their products with a certain level of particularity. For example, an e-commerce company may ask a manufacturer or merchant to describe its products using attributes and values that can be added to a searchable index connected to a product search mechanism. However, this manual process is time-intensive and costly to implement.

Accordingly, there remains a need for improving navigation of e-commerce websites and the ability for users to locate and compare desired products.

SUMMARY

Tools and techniques for converging terms within a collaborative tagging environment are described herein. Methods for converging divergent contributions to the collaborative tagging environment may include receiving respective contributions from users within the environment. The methods may identify at least some of the contributions as divergent, and enable the users to converge the divergent contributions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to collaborative structured tagging for tagging content made available over the Internet. As an overview, collaborative structured tagging enables a community of users to define and assign different types of tags to the content. Tags are pieces of information separate from, but related to, the content. In the collaborative environment, the tags are descriptors freely chosen by different users to characterize or otherwise describe attributes of the content, rather than having the description controlled by a centralized classification process. With this freedom, the tags can specify properties of an item that may not otherwise be obvious from the item itself. The different types of tags are associated with one another to form a non-flat or dimensional tagging data structure that supports navigation, content searching, and content comparison.

In one implementation, the dimensional tagging data structure is employed in a collaboratively-defined item encyclopedia that describes items offered in electronic catalogs. Through collaborative effort, users author descriptions of new items or edit existing item descriptions authored previously by themselves or others. As a result, the item descriptions become more accurate and uniform over time, thereby improving the user's ability to find items of interest on the website. Further, users are empowered to define tags that characterize the items and identify attributes of the items. Over time, the collaboratively defined tags form a folksology (an attributed folksonomy) to categorize the items offered in the catalog. Once assigned to items, the tags may be used to locate and organize the items, as well as facilitate comparison of various items.

For purposes of discussion, the collaborative structured tagging is described in the context of an electronic catalog hosted by a merchant website. One exemplary implementation of this environment is provided below. However, it should be appreciated that the collaborative structured tagging may be implemented in other environments.

Example System Architecture

Figure 1:
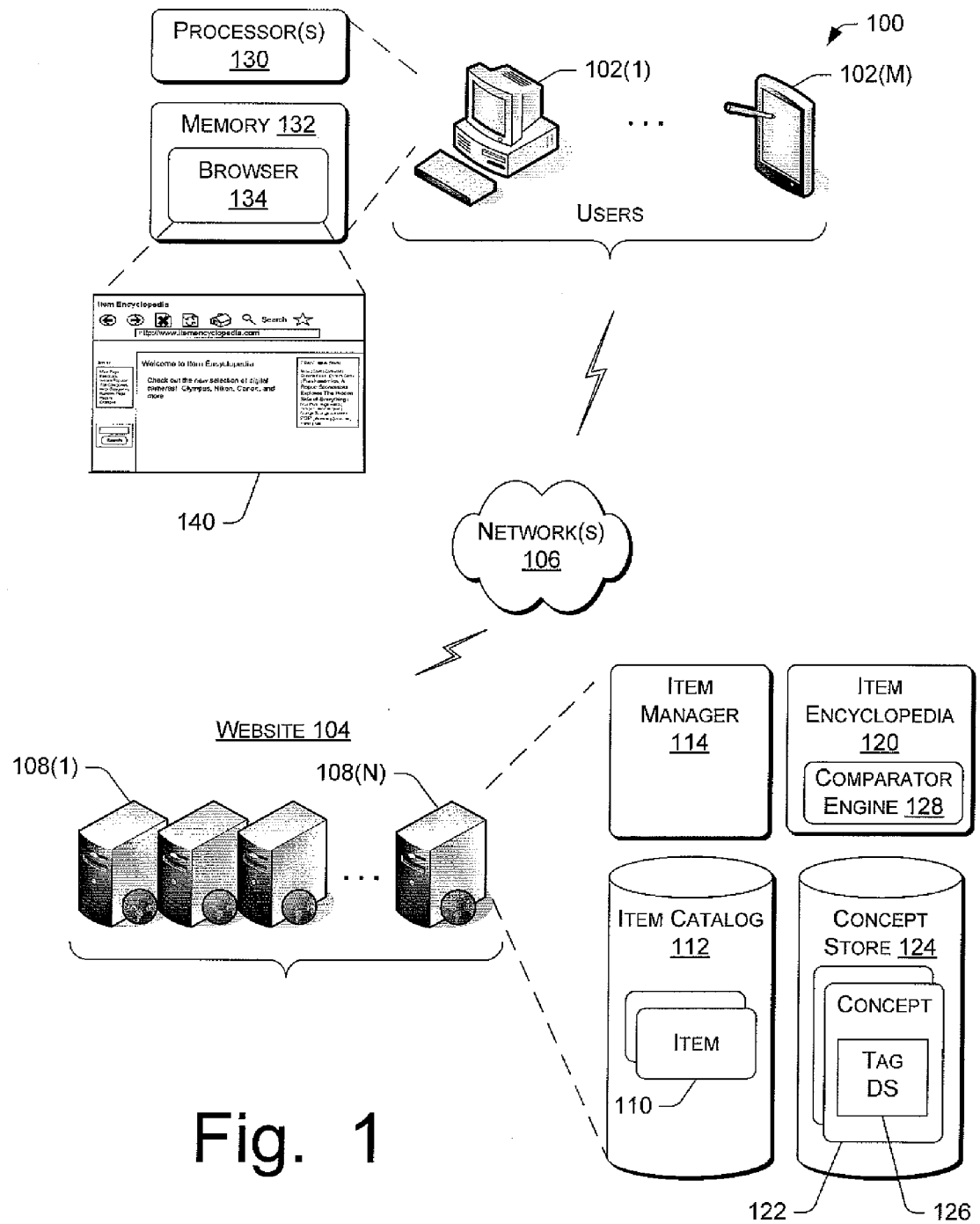
FIG. 1 illustrates an example architecture for implementing an item encyclopedia via collaborative structured tagging. The network environment includes multiple clients coupled via a network to a server system that hosts an electronic catalog of items referenced by the encyclopedia.

FIG. 1 illustrates an example architecture 100 in which collaborative structured tagging many be implemented. In architecture 100, many user computing devices 102(1), ..., 102(M) can access a website 104 via a network 106. The network 106 is representative of any one or combination of multiple different types of networks, such as cable networks, the Internet, and wireless networks.

The website 104 is hosted on one or more servers 108(1), ..., 108(N), perhaps arranged in a cluster or as a server farm. Other server architectures may also be used to host the site. The website 104 is capable of handling requests from many users and serving, in response, various web pages that can be rendered at the user computing devices 102(1)-102(M). The website 104 can be essentially any type of website that supports user interaction, including online retailers, informational sites, search engine sites, news and entertainment sites, and so forth.

In the exemplary environment, the website 104 is representative of a merchant website that hosts an electronic catalog with one or more items. An item can be anything that the merchant wishes to offer for sale, or that others using the merchant's website wish to offer for sale. An item can include a product, a service, or some other type of sellable unit.

In FIG. 1, a collection of item records 10 are stored in an item catalog database 112, which is accessible, directly or indirectly, by one or more of the servers 108(1)-108(N). Each item record 110 contains information about an associated item being offered for sale on the website 104. For products such as books or music CDs, for example, the item record may contain a description, images of the product, author/artist names, publication data, pricing, shipping information, and so forth. For other types of items, the item record may contain different information appropriate for those items.

An item manager 114 facilitates access to and management of the item records 110 in the catalog 112. The item manager 114 allows the website operators to add or remove items to the catalog 112, and generally maintain control of the items offered on the website 104. When a user requests information on an item from the website 104, one or more servers 108 retrieve the item information from the item catalog 112 and serve a web page containing the information to the requesting user computing device. The database 112 may therefore contain static web pages that are pre-generated and stored prior to such requests, or alternatively store data that is used to populate dynamic web pages that are generated in response to such requests.

The website 104 may also host an item encyclopedia 120 to offer rich authoritative information on the various items in the catalog. The item encyclopedia 120 facilitates creation of articles about the items in the catalog. These articles may include any information helpful to a user in learning about the item and deciding whether to purchase the item. Such information may include descriptions of the items, features and specification data, images of the item, intended uses, identities of manufacturers or distributors, accessories, and so on. These articles can be served by the servers 108 to the users to assist the users in better understanding the items.

In one implementation, the encyclopedia articles are community-authored, where any number of users may add, modify, or delete content contained in the encyclopedia. Thus, individual users can define new items being offered in the catalog, and also edit articles crafted by other users. The edits can be logged and monitored to prevent malicious entries. Discussion pages, review history, and even the ability to watch pages may further be supported by the item encyclopedia 120.

The item encyclopedia 120 also supports tagging of the items with tags to assist in navigation, search, and comparison. These tags may be assigned by the manufacturer or supplier of the items, the website operator, or any member of the community. The tagging is free-form in that anyone can add any tag just by typing, akin to tagging on websites such as "del.icio.us" and "flickr.com". But, unlike flat tagging approaches used by such websites, the tags are applied within a non-flat or dimensional data structure having multiple different kinds of tags. This structure enables cross-product comparison and dimensional product navigation. In the described implementation, the tagging structure includes category tags and associated fact tags, as will be described below in more detail with reference to FIG. 2.

The articles and tags are stored as concept objects 122 in a concept store 124. The concepts 122 are objects with metadata corresponding to the items represented in the catalog 112. Individual concepts 122 include a tagging data structure 126 that supports tagging of the items or other content made available online.

Figure 2:
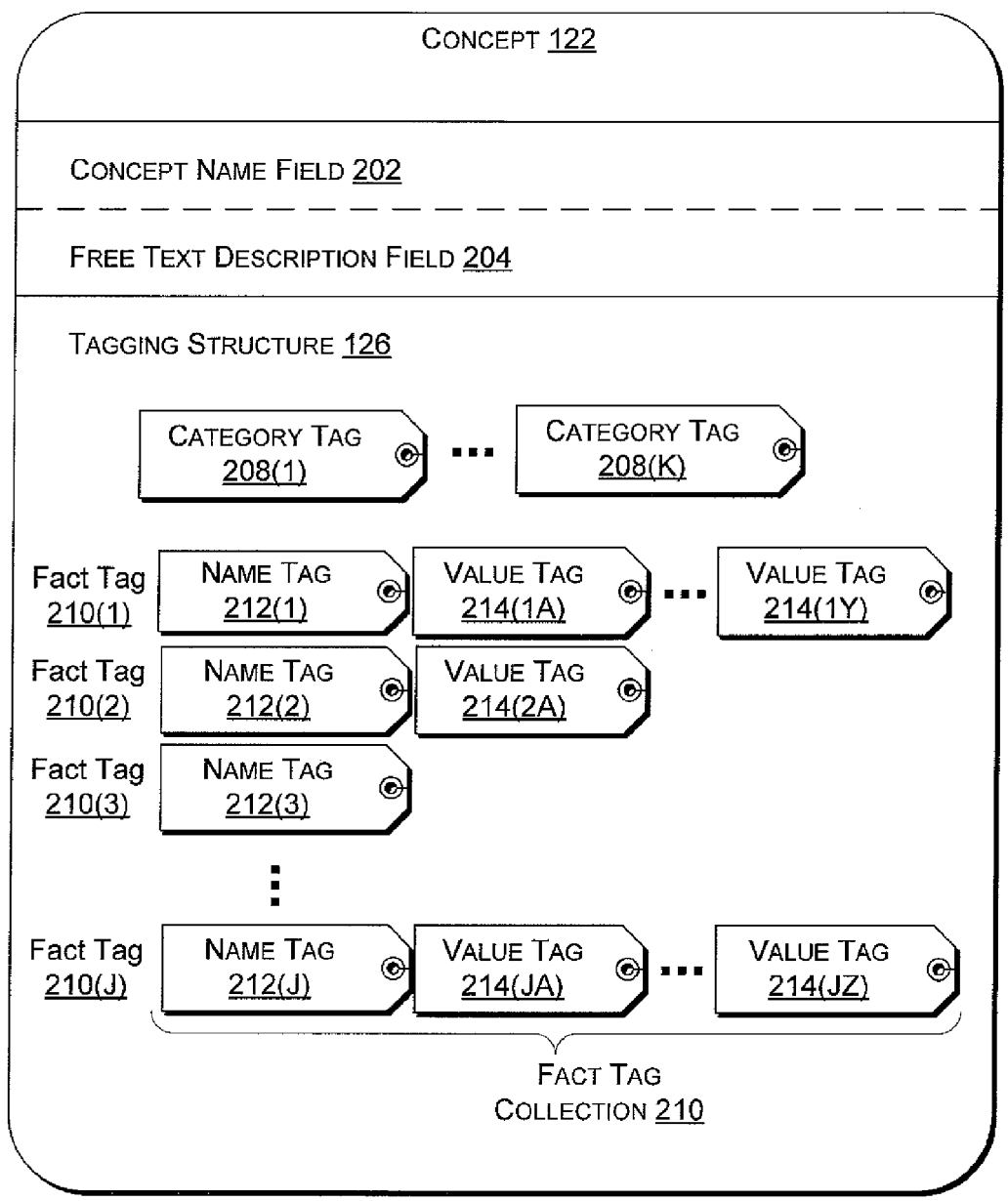
FIG. 2 illustrates an example implementation of a concept object that maintains a tagging data structure used in the collaborative structured tagging.

FIG. 2 illustrates one example implementation of a concept object 122. The concept 122 includes a concept name field 202, a free text description field 204, and the tagging data structure 126. The concept name field 202 contains a unique name of the concept for purposes of identifying the concept. The free text description field 204 allows users to enter a description of the concept, the associated item, or both.

The tagging data structure 126 associates multiple tags including one or more first or category tags 208(1)-208(K) and one or more collections of second or fact tags 210(1)-210(J). The category tags 208(1)-208(K) characterize the items in terms of generic or objective categories. For instance, suppose that the item is an Olympus® brand digital camera sold by the Olympus Corporation. In this example, a category tag might be "digital camera".

The facts tags 210(1)-210(J) are associated with the concept 122 and provide facts about the catalog item represented by the concept 122 in the item encyclopedia. For each category tag 208(1) through 208(K), there is a set of zero or more fact tags 210 associated with describing the item in the way in which the stated category are typically described. For example, suppose the item is a camping tool with an integrated flashlight and compass. The item may be tagged with two category tags, such as "Flashlight" and "Compass". The fact tags describing the attributes of the item might include one set of fact tags pertaining to the flashlight aspects of the item and another set of facts pertaining to compass aspects of the item. Thus, associated with the category tag "Flashlight", the concept 122 may include fact tags for the item with a name:value of "Batteries Needed: 4 AA". For the category tag "Compass", the concept 122 may included fact tags for the item with a name:value of "Magnetic Sensitivity: High".

Each of the fact tags 210(1)-210(J) has a name portion 212 to identify an attribute of the item and one or more corresponding value portions 214 that provide one or more values of the attribute identified by the name portion. Said differently, each fact tag has a name:value pair, where there may be more than one value for each name. Moreover, the name portion 212 and the value portion(s) 214 are also tags.

Thus, each fact tag is composed of a collection of one name tag and zero or more value tags. In FIG. 2, the first fact tag 210(1) is composed of one name tag 212(1) and multiple value tags 214(1A)-214(1Y). For instance, is the digital camera example, the name tag might be "color" and the value tags might be "silver", "black", and "white". The first fact tag 210(1) is an example of a multi-part fact tag, where there are one or more value tags 214(1A)-214(1Y) associated with the name tag 212(1). The second fact tag 210(2) is composed of one name tag 212(2) and one value tag 214(2A). Here, the name tag might be "weight" and the value tag might be "4.52 oz (128 grams)". The second fact tag 210(2) is also representative of a multi-part fact tag in that it has at least one name tag 212(2) and at least one value tag 214(2A). The third fact tag 210(3) is composed of just one name tag 212(3) and no value tags. In this case, the name tag might be "weatherproof", where presence of the name tag would suggest that the item is weatherproof, and absence of the name tag would suggest that it is not. This third fact is representative of a singleton fact tag, where there are no value tags associated with the name tag 212(3). Over time, the collaboratively defined tags form a folksology to categorize the items offered in the catalog.

From one perspective, the tagging structure may be considered dimensional in that the category tags define what the item is and the fact tags, in the context of the category tags, define attributes or features of the item as characterized by the category tags. Further, the attribute or name tags are associated via the structure with one or more value tags. The tagging structure thereby provides relationships among terms that enable many useful functions for the user when exploring features of a product. Unlike previous flat tag approaches, where there is no distinction between category or fact tags, or between name tags and value tags, the non-flat tagging structure 126 allows users to easily compare multiple items according to a category selected by the user. With the flat tag approach, there is no way to describe the nature of a relationship between the tags.

For instance, suppose the user would like to compare all "digital cameras" in the item catalog. The user simply selects this category tag and all items tagged with this category tag are located, and then the related fact tags of "color" and "weight" associated with the category tag of "digital camera" are easily arranged for convenient observation. For instance, the name tags are aligned horizontally, with associated value tags grouped vertically beneath their corresponding name tags. A more detailed example, along with an exemplary UI, is provided below with reference to FIG. 5. In contrast, with a flat tag structure, where there is no distinction between digital camera, color, and weight, there is no way for the system to understand how to align the attributes upon selection of "digital camera". Furthermore, since there are no name:value pairs in the flat tag approach, there is no context for a comparison. The system has no context for how to compare "color" since there is no value associated with "color" in a flat tag approach.

It is noted that the concept object 122 shown in FIG. 2 is merely representative. Other data or content may be included. For instance, if the website supports other services, such as a chat or discussion forum that allows user to talk about the items, then the concept 118 may also include associated content that may be used in this forum.

With reference again to FIG. 1, the item encyclopedia 120 allows users to collaboratively define tags for the items in the item catalog 112. The user-defined tags are added to the tagging data structure 126 as part of the concept objects 122. Once the items are tagged, the encyclopedia 120 may use the category and fact tags to locate and organize the items. For instance, a user may select a category tag "digital camera" (e.g., via a search engine or upon clicking a tag titled "digital camera" on a page). In response, the encyclopedia 120 finds all concepts 122 having a category tag of "digital camera" in the tagging structure 126 and returns a listing of these concepts. From these identified concepts, the item manager 114 may locate the items 110 which are presumably digital cameras.

The item encyclopedia 120 further includes a comparator engine 128 to facilitate comparison of various items based on the tags in the tagging structure 126. A user may request to compare all products with a category tag of "digital cameras" and a fact tag of "weight". The comparator engine 128 would retrieve those concepts with the category tag and fact tag, and order them accordingly in a presentation for the user's review. One particular approach to comparing items will be described below in more detail.

While the tagging structure 126 is shown implemented in conjunction with an item encyclopedia, it is noted that the tagging structure may be implemented in other context where a content manager is used to manage content to be served via a website. It is further noted that the electronic catalog and encyclopedia need not be hosted by the same website (as illustrated in FIG. 1 for simplicity of discussion), but instead may be provided as separate services residing on different server systems. For instance, the item encyclopedia may be a service hosted by a separate website that integrates with one or more other merchant websites.

The user computing devices 102 (also referred to as "client computers" or simply "clients") may be implemented as any number of computing devices, including as a personal computer, a laptop computer, a portable digital assistant (PDA), a cell phone, a set-top box, a game console, and so forth. Each user computing device 102 is equipped with one or more processors 130 and memory 132 to store applications and data. A browser application 134 is shown stored in memory 132 and executes on a processor 130 to provide access to the website 104. The browser 134 renders web pages served by the website 104 on an associated display.

When a user accesses the website 104, the client 102 submits a request typically in the form of a uniform resource locator (URL) to the servers 108. Upon receiving the request, the servers 108 return a web page back to the requesting client computer. In the context of a merchant website, the web page may include one or more items of interest to the user. The web page may alternatively or additionally include item information, such as articles and tags, which is collaboratively defined by the community of users to provide more extensive information than what might otherwise have been provided by the seller, manufacturer, or website operator. The user computing device uses the browser 134 to render the web page, allowing the user to interact with the web page. In FIG. 1, the browser 134 is shown rendering a web page 140. In this illustration, a home page for the item encyclopedia is displayed.

Collaborative Structured Tagging

The website 104 provides both an item catalog as well as a community-defined item encyclopedia to provide an enriched user experience. In support of the catalog and encyclopedia, the website 104 supports collaborative structured tagging that, in part, makes it easier for users to navigate the item catalog, locate the precise items of interest, and compare those items with other similar items. To better illustrate the user experience provided by the collaborative structured tagging, FIGS. 3-8 show renderings of various web pages served by the website 104. In this example, the item is a digital camera. Furthermore, this example is described in the context of a community-defined item encyclopedia. It is noted that other formats and services may employ collaborative structured tagging to enhance user experience while searching for content on the Internet.

Figure 3:
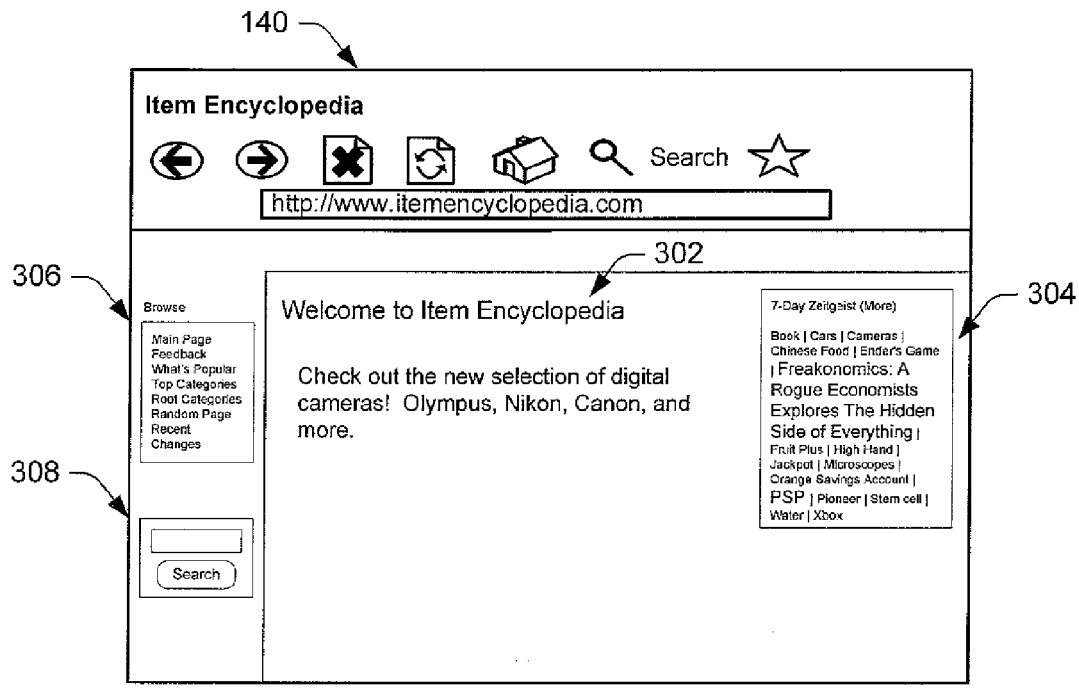
FIG. 3 illustrates a screen rendering of an exemplary home page for the item encyclopedia.

FIG. 3 shows a home page 140 for the item encyclopedia, which might be served and rendered, for example, when the user first accesses the website 104. The home page 140 includes a welcome pane 302 with a greeting. The home page might also contain other controls or navigation tools, such as a zeitgeist 304 listing the most popular or interesting tags over the past seven day period, a list of navigation links 306, and a search tool 308. The home page may further include reference to any new items that have been added to the catalog or highlight promotions.

The home page 140 may also provide controls to assist users in creating new articles for the encyclopedia. For example, the home page 140 may provide a "click to create" entry in the search results, and a "create something like this" entry on product and category pages.

The search tool 308 allows the user to locate items in the item catalog or articles from the encyclopedia about the items. By entering one or more key terms, users can search on category tags, fact tags, titles, and the free text of articles in the encyclopedia. If an item exists, the website serves a webpage with information about the item. Suppose the user is interested in exploring digital cameras. In particular, the user wants to learn more about the Olympus® Stylus 800 digital camera. The user might enter the terms "Olympus", "Stylus", and "800" into the search tool 308. The user may also access the web page by following links on the homepage or the tags in the zeitgeist 304.

Figure 4:
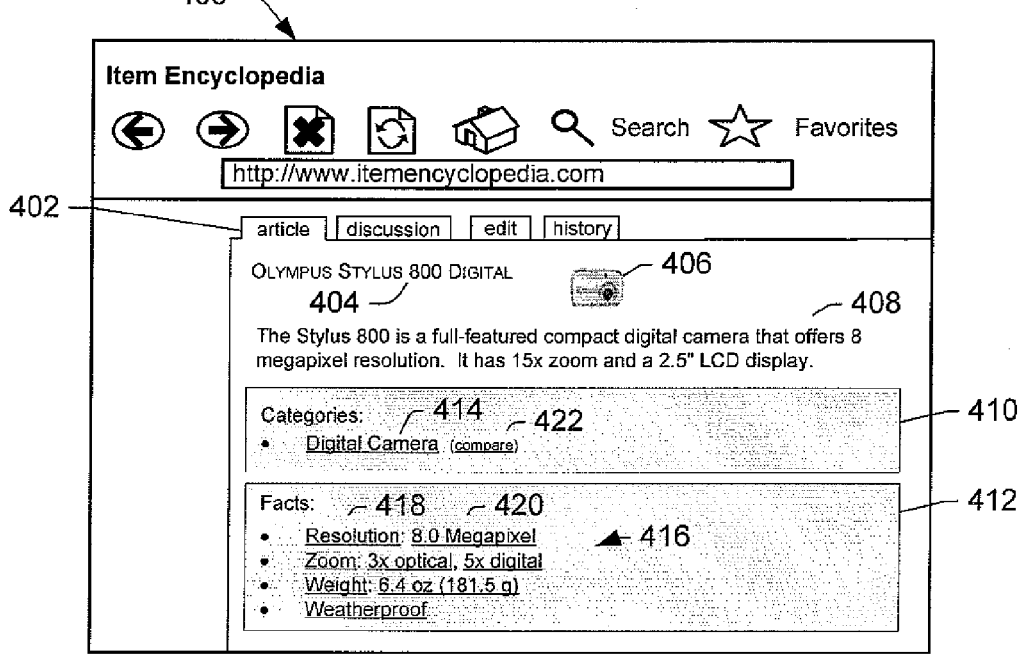
FIG. 4 illustrates a screen rendering of an exemplary article page in the item encyclopedia.

FIG. 4 shows a rendering of web page 400 served in response to a user's request for information on the digital camera. In page 400, the "article" tab 402 is selected to present an informative article of the digital camera that was drafted by the manufacturer, retailer, or a user in the community. The article includes a name of the item 404 (i.e., "Olympus Stylus 800 Digital") along with an image 406 of the camera. A description 408 resides just below the item name 404 and image 406, although other layouts may be used. The description 408 may be an original description provided by the manufacturer, or a description crafted by the website operator, or information given by a user in the community. Moreover, the description may represent several iterations authored by multiple users in the community.

The article page 400 also has a category section 410 and a fact section 412 located beneath the description 408. The category section 410 lists one or more category tags to which the item may belong. In this example, the item belongs to the category "digital camera" and is represented on the page by a selectable category tag 414 (as illustrated with underlining, although in practice the tag may be represented using other techniques, such as color variation). The contents for the category tag are provided by the category tag field(s) 208(1)-208(K) in the tagging structure 126 of the concept 122 (See FIG. 2).

It is noted that other items maintained in the item catalog may have more than one category tag. For instance, an item titled "XYZ Radio Alarm Clock" may have multiple category tags, including one for the category "Radio" and one for the category "Alarm Clock".

The fact section 412 contains one or more fact tags 416 that are associated with the category tag 414 for the item. Each fact tag 416 has a name portion 418 identifying an attribute of the item and one or more corresponding value portions 420 providing one or more values of the attribute identified by the name portion 418. For instance, in FIG. 4, the first fact tag has a name portion "Resolution" to identify the resolution attribute of the digital camera and a value portion "8.0 Megapixel" to provide the value of the resolution attribute named "Resolution". The second fact tag in the facts section 412 has a name portion "Zoom" to identify the zoom attributes of the digital camera and multiple value portions of "3× optical" and "5× digital". The third fact tag has a name portion "Weight" to identify the weight of the camera and one value portion "6.4 oz (181.5 g)" to provide the value. Fact tags such as these, with at least one value tag for each name tag, are referred to as multi-part fact tags. The fourth fact tag in the facts section 412 has a name portion "Weatherproof" and no corresponding value portion. This fourth fact tag is an example of a singleton fact tag, where no value is provided for the corresponding attribute.

Notice also that both the name portion 418 and value portion 420 of the fact tags 416 are tags. This is illustrated by the underlining beneath the words. Thus, each fact tag is composed of multiple tags, including one name tag and zero or more value tags associated with the name tag. Each tag is independently selectable. In this manner, the each fact tag can be thought of as a collection of associated tags.

Users are able to add new category and fact tags within the rules governing the community. For example, a user may wish to add the category tag "video camera" since the digital camera is capable of recording short video clips. Once added, the category section 410 would include this new category tag next time a user requests the article page 402. Furthermore, users can easily add fact tags for an item as a way to highlight different attributes and values. For instance, in FIG. 4, a user might be compelled to add fact tags to physical dimensions, color, capture modes, and so forth.

Users can efficiently and easily navigate through articles using the tags. For instance, users might navigate from a fact tag to the articles that use it and vice versa, or perhaps from a category tag to articles of that category and vice versa. Selection of anyone of the tags results in a new article page. For example, when the user selects the "resolution" tag in the fact section 412, an article page entitled "Resolution" is presented. The "Resolution" article page may have a description (akin to description 408) describing the term "resolution" as used in the context of digital cameras, if a user in the community has taken time to draft this article. Additionally, new categories are presented in category section 410 and new facts are listed in fact section 412, assuming again that a user has taken time to add these tags.

As further shown in FIG. 4, the rendered web page 400 allows the user to make comparisons. In this example, the user is given the option of comparing digital cameras by selecting a "compare" link 422 located adjacent the "digital camera" category tag 414. Upon selection of this compare link, the servers 108 locate other items in the item catalog that have been tagged with the category tag "digital camera" and present the results to the user. It is noted that other tags may be used in the comparison feature, including category, name, and value tags.

Figure 5:
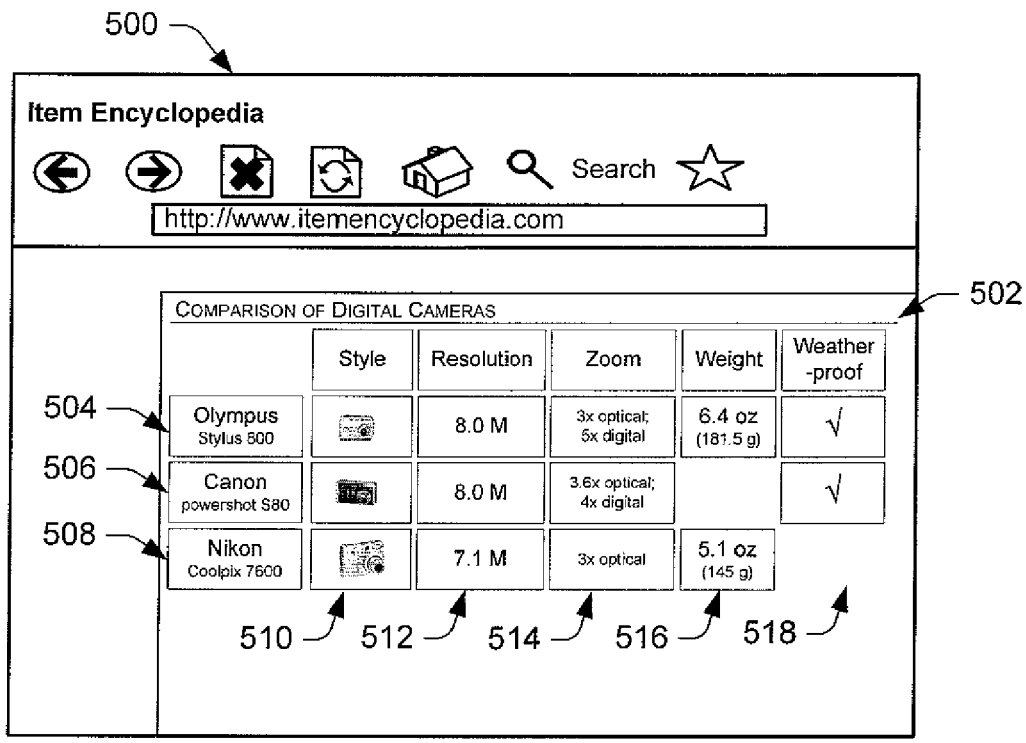
FIG. 5 illustrates a screen rendering of an exemplary comparison page to compare items described by the item encyclopedia.

FIG. 5 shows a rendering of web page 500 served in response to the user's selection of the "compare" feature 422 in web page 400 (FIG. 4). In page 500, a comparison of all items with a category tag of "digital camera" is presented to the user to assist in learning more about an item and/or making a more informed decision prior to purchase. In the illustrated example, the results are presented in a table or chart 502 where items being compared are arranged in rows, with each column providing a comparison of an attribute of interest. Here, three digital cameras were identified as having a "digital camera" category tag: an "Olympus Stylus 800" digital camera provided in row 504, a "Canon PowerShot S80" digital camera in row 506, and a "Nikon Coolpix 7600" digital camera in row 508.

Various attributes to compare the digital cameras are arranged in columns 510-518. More specifically, an image showing the styling of the cameras is provided in column 510 to afford a visual cue of the camera. The remaining columns 512-518 present the fact tags associated with the category tag "digital camera" for those items in the comparison table 502. Here, the pixel count is provided in column 512, the zoom attribute is provided in column 514, the weight is in column 516, and the weatherproof attributes is provided in column 518.

In one implementation, the fact tag columns may be ordered or otherwise ranked according to pre-determined criteria, such as relevance of the facts within each item. For instance, if every item has a fact tag "Resolution" that is prominent in its own article page, the column 512 comparing pixel counts may be ordered higher in comparison to other facts. One exemplary ranking process is described below with reference to FIG. 11.

Since users define the articles and tag the items, there may not be uniformity across all items being compared. In this example, the concept object associated with the "Canon" digital camera in row 506 does not have a fact tag for "weight". This might be because the manufacturer does not release the information, or the manufacturer or a user in the community has never tagged this item with a weight. Hence, there is no entry in column 516 for the "Canon" digital camera. Similarly, there is no "weatherproof" fact tag for the "Nikon" digital camera. However, all three items have associated fact tags for "Resolution" and "Zoom".

Deciding which terms are used in the category and fact tags is driven by the community over time, and perhaps in cooperation with the website operator. Thus, when one user enters the fact name "Weight" and another user employs the fact name "Bulk", the community of users (and/or the website operator) eventually drives the vocabulary to consistently use one term or the other.

The website may further support discussion about the items in the catalog. As shown again in FIG. 4, a "discussion" tab may be selected when the user wishes to talk about the item.

Figure 6:
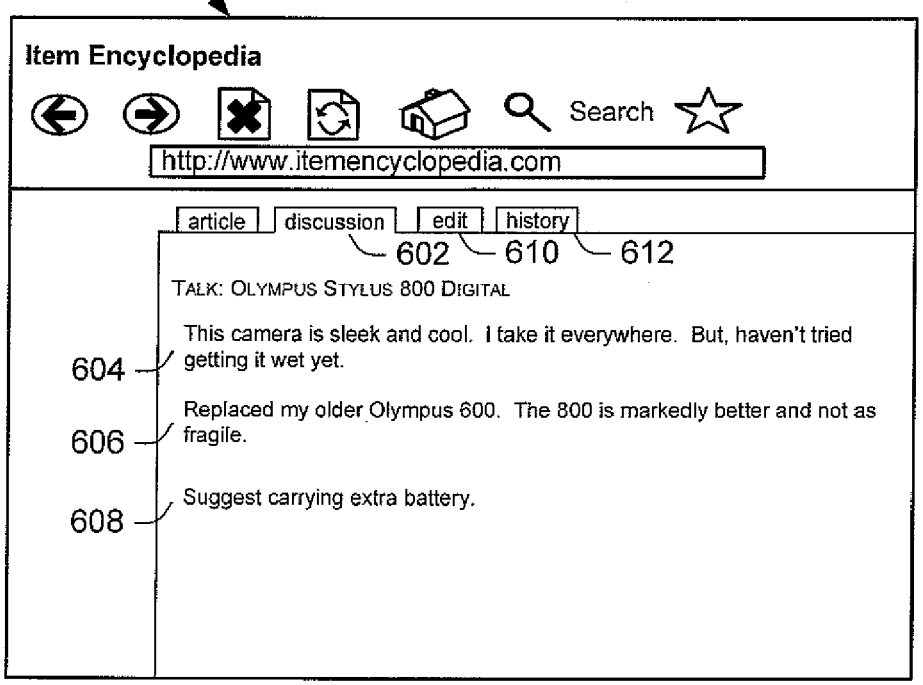
FIG. 6 illustrates a screen rendering of an exemplary discussion page in the item encyclopedia.

FIG. 6 shows a rendering of a web page 600 served in response to the user's selection of the "discussion" tab 602. The discussion page is titled "Talk: Olympus Stylus 800" to let users in the community discuss this particular digital camera. Several discussion entries 604, 606, and 608 are shown in the page.

Figure 7:
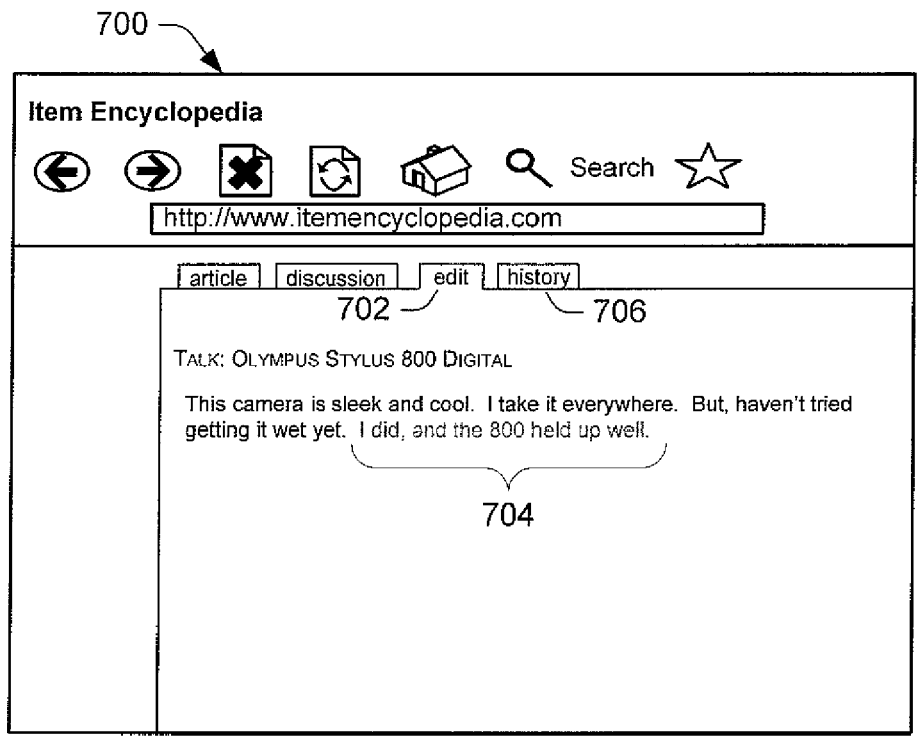
FIG. 7 illustrates a screen rendering of an exemplary edit page in the item encyclopedia. Through the edit page, the user is able to edit the article or discussion.

An edit tab 610 allows the user to edit the discussion, articles, or tags. FIG. 7 shows a rendering of a web page 700 after the user selects the "edit" tab 702. Here, the user adds the sentence 704 (i.e., "I did, and the 800 held up well.") to existing text in a discussion. With the edit functions, users can add or correct text and tags without having to learn any special syntax.

Figure 8:
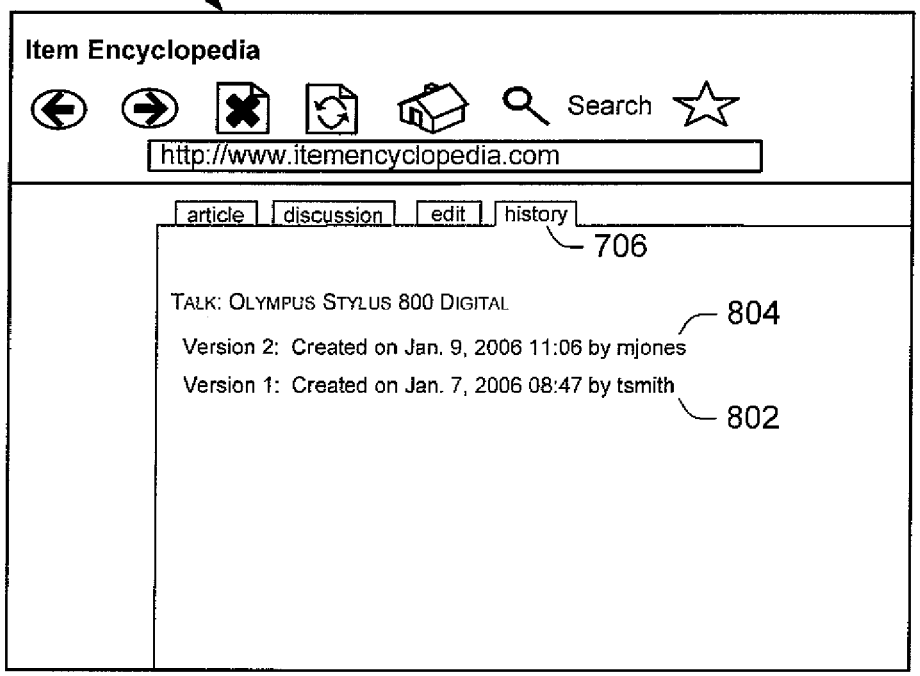
FIG. 8 illustrates a screen rendering of an exemplary history page in the item encyclopedia, which is used to track edits made to the article or discussion.

A history of such edits is tracked by the encyclopedia. A user can view the edit history by selecting the "history" tab 706. FIG. 8 shows a rendering of a web page 800 in response to selection of the "history" tab 706. In this example, there have been two postings on this discussion, a first version 802 posted by "tsmith" and a second version 804 posted later by "mjones".

Item Manager Implementation

Figure 9:
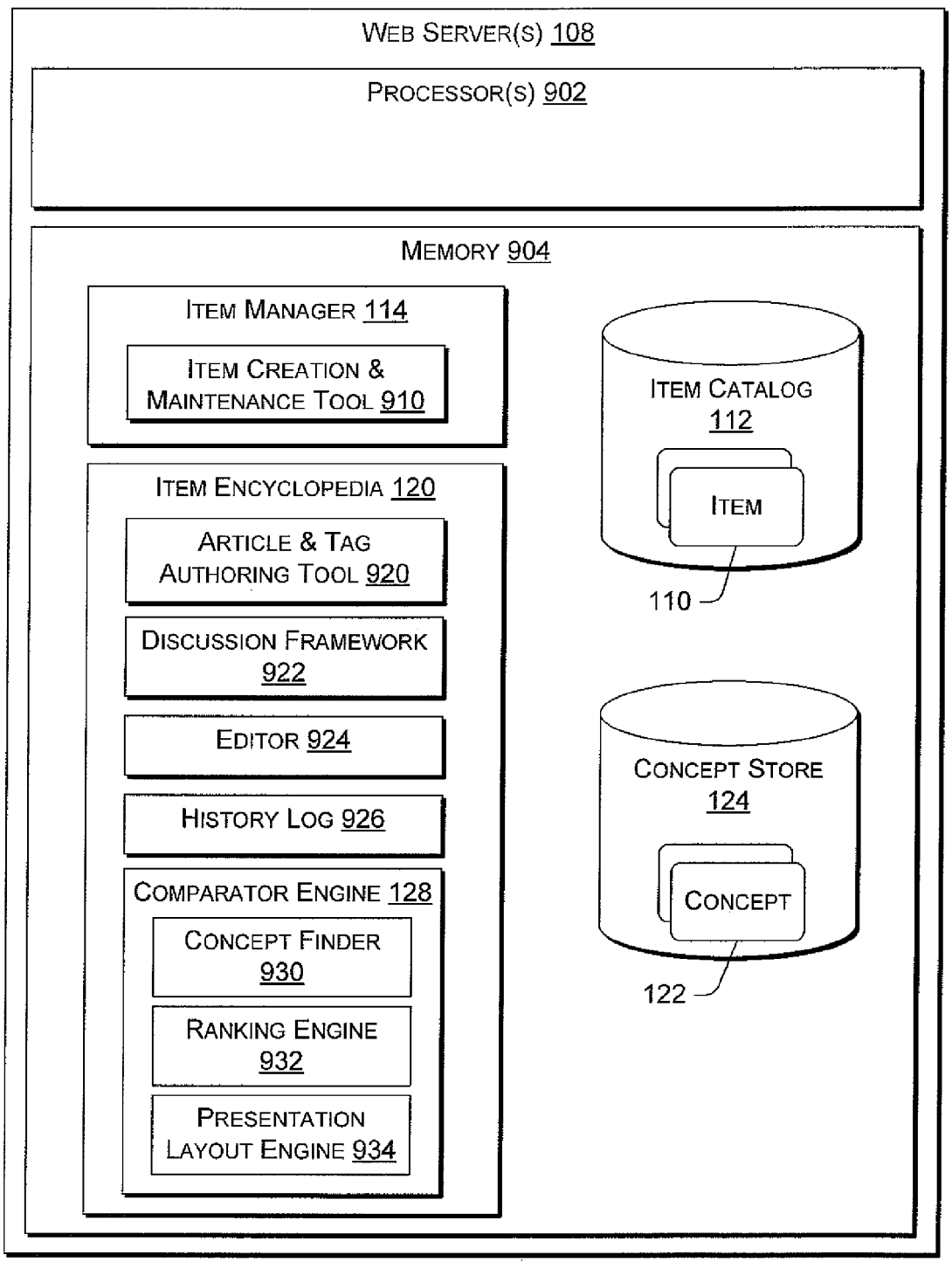
FIG. 9 is a block diagram illustrating modules in the item manager and item encyclopedia.

FIG. 9 illustrates an example implementation of the item manager 114 and item encyclopedia 120 that is run as software on one or more of the web servers 108(1)-108(N). The web servers have processing capabilities and memory suitable to store and execute computer-executable instructions. In this example, the web server(s) 108 include one or more processors 902 and memory 904. The memory 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The item manager 114 and item encyclopedia 120 are implemented as software or computer-executable instructions stored in a memory 904 and executed by one or more processors 902. The item manager 114 includes an item creation and maintenance tool 910 to facilitate creation and maintenance of item records 110 in the item catalog 1 12. Such items may be created and posted by the website operator (e.g., an owner of a merchant website), the manufacturer, distributor, retailer, or any one in the user community.

The item encyclopedia 120 facilitates creation and management of the concept objects 122 maintained in concept store 124. The encyclopedia 120 includes an article and tag authoring tool 920 that enables users to author articles describing the items 110 in the item catalog 112. Users are further enabled to tag the items with category and fact tags. In this manner, the article and tag authoring tool 920 produces a concept object 122 that contains the articles, tags, and other item metadata. An example concept 122 is illustrated and described in more detail with reference to FIG. 2.

The item encyclopedia 120 may also be implemented with a discussion framework 922 to facilitate user discussion of the products. The discussion framework allows users to enter and post their commentary. The framework 922 then formats the commentary for presentation to the user, as well as allowing a mechanism for other users to offer feedback on the commentary. An editor tool 924 facilitates user-based editing of the description provided in the encyclopedia articles and/or the commentary supported by the discussion framework 922. For example, when viewing an article or discussion about the item, a user may enter edits by selecting the "edit" tab 702 on the UI (FIG. 7). The editor tool 924 receives the edit, formats it, and presents it with the original text, as illustrated in FIG. 7.

Returning to FIG. 9, the item encyclopedia 912 has a history log 926 to track the changes entered by the community of users. A summary of the history log 926 can also be presented to the users as illustrated, for example, in FIG. 8.

The comparator engine 128 facilitates comparison of the items based on the category and fact tags. Comparisons can be made for items with the same category tags or the same fact tags. In one implementation, the comparator engine 128 includes a concept finder 930, a ranking engine 932, and a presentation layout engine 934. When the user wishes to compare similarly tagged items (e.g., a "digital cameras" category tag), the concept finder 930 locates the concepts 122 in the concept store 124 with the same tags. The ranking engine 932 gathers all of the fact tags for the set of found concepts and orders them according to some criteria (e.g., relevance, coverage, etc.). The presentation layout engine 934 builds a graphical layout for presentation of the ranked results. An example web page with a chart layout presenting a comparison of digital cameras is shown in FIG. 5. A more detailed discussion of how the comparator engine operates, along with an example, is provided below with reference to FIG. 11.

Operation

Figure 10:
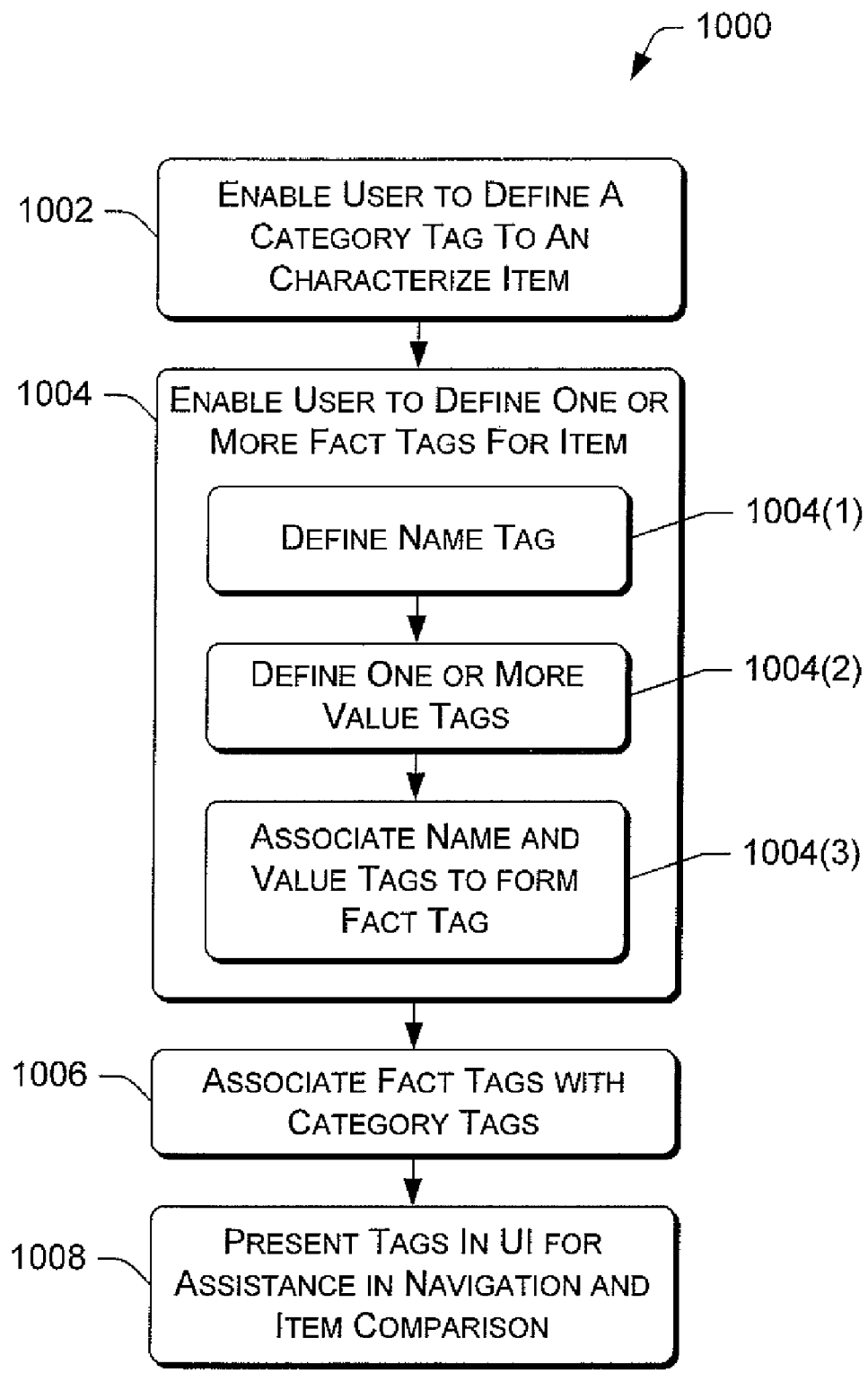
FIG. 10 is a flow diagram of a process for tagging content.
Figure 11:
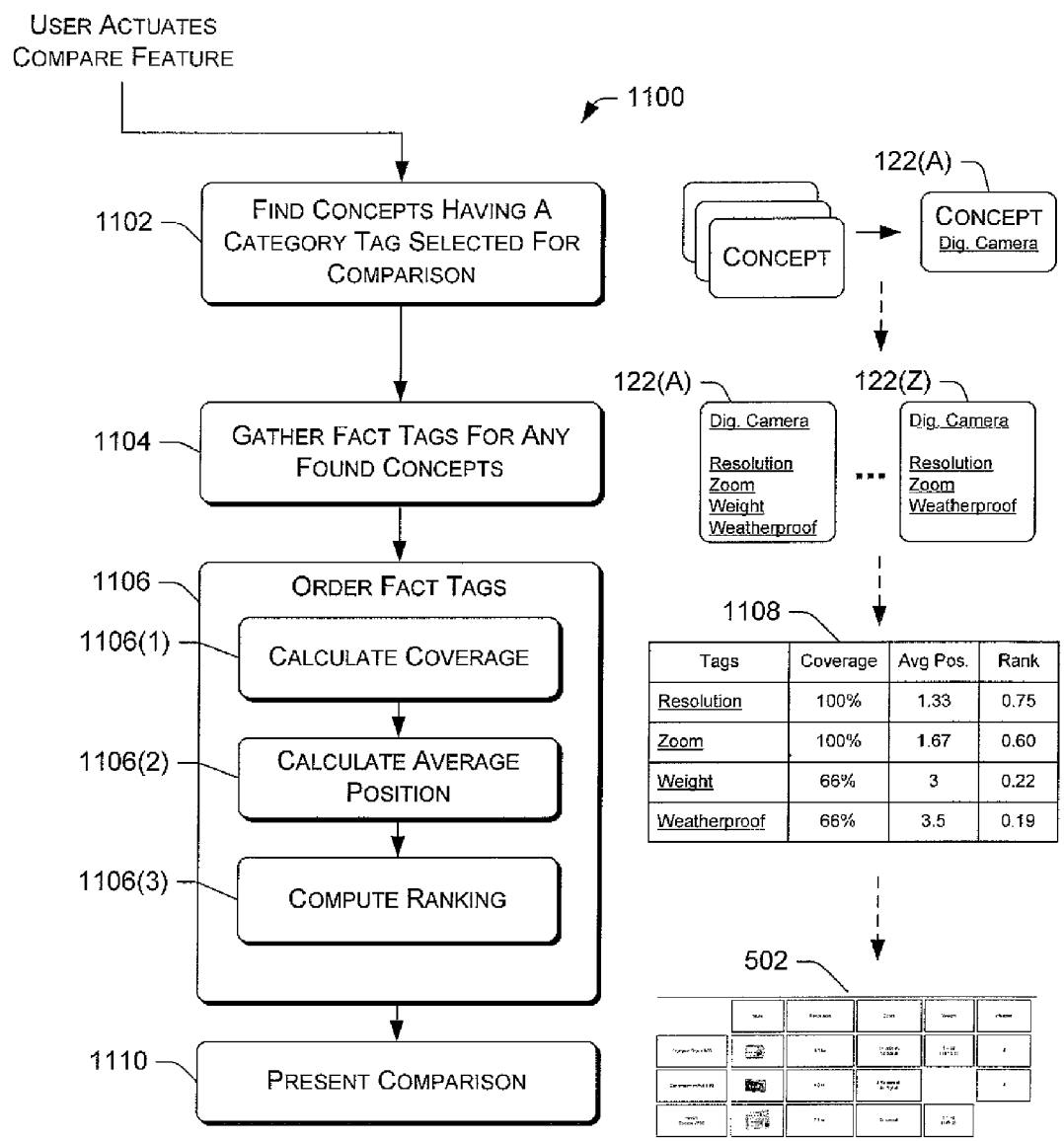
FIG. 11 is a flow diagram of a process for comparing items through use of the tags.

FIGS. 10 and 11 illustrate example processes for tagging digital content and facilitating comparison of items using the tags. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the architecture 100 of FIG. 1, and the item encyclopedia 120 of FIGS. 1 and 9. In particular, many acts described below may be implemented and performed by the item encyclopedia 120 illustrated in FIGS. 1 and 9, and particularly subcomponents of the item encyclopedia 120 shown in FIG. 9.

FIG. 10 shows a process 1000 for tagging items in an electronic catalog. At block 1002, a user is enabled to define a category tag for an associated item. This first kind of tag is used to characterize or categorize the item. It essentially tells what the product is. In the context described above, the user can define tags through interaction with a web page served as part of the item encyclopedia (e.g., the home page 140 in FIG. 3 or the article page 400 in FIG. 4). The tagging is free-form in that the user can assign any descriptor he or she chooses, although it is anticipated that uniformity will grow over time as more users become accustomed to the items and vocabulary used to describe the items. In the context of the example shown in FIG. 4, a user who creates an article on a particular digital camera, such the "Olympus Stylus 800" brand digital camera, may define a category tag "digital camera".

At block 1004, the user is further enabled to define one or more fact tags for the item. This may be done at the time an article in the encyclopedia is first created, or added later by any user. As with category tags described above, the user can define tags through interaction with a web page served as part of the item encyclopedia, and the tagging is free-form. It is further noted that a user may define fact tags independently of category tags, and hence defining a category tag is not a prerequisite to defining fact tags. Moreover, a concept may include fact tags along, without a category tag. However, once both category tags and fact tags are defined for a given item, a relationship is maintained among the tags via the tagging structure 126 of the concept 122.

Defining a fact tag may be viewed as a series of sub-operations 1004(1)-1004(3). As explained above, the fact tags are composed of collections of two or more tags, including one name tag and one or more value tags. Accordingly, at 1004(1), the user defines a name tag that identifies an attribute of the item being characterized by the category tag In the digital camera example, the user might define a name tag for "weight" or "zoom", as these represent attributes that might be of interest to users who are shopping for a digital camera.

At 1004(2), the user defines one or more corresponding value tags that provide one or more values for the attribute identified by the name tag. For a "weight" name tag representing a physical weight attribute of the camera, the value tag might be the actual weight in ounces or grams, such as "6.4 oz (181.5 g)". For a "zoom" name tag representing the zoom attribute of the camera, multiple value tags might be defined to express the different zoom components. For instance, a first value tag of "3× optical" might be defined to indicate that the zoom attribute achieves a three fold zoom action through optical lens manipulation and a second value tag of "5× digital" might be defined to indicate that the zoom attribute achieves an additional five fold zoom action through manipulation of the digital image after capture.

At 1004(3), the name and value tags are associated with one another to form a fact tag. In our example, the "weight" name tag is associated with the corresponding value tag "6.4 oz (181.5 g)" and the "zoom" name tag is associated with the corresponding value tags "3× optical" and "5× digital". The association is accomplished, for example, by the item encyclopedia 120 correlating the name tag with its one or more corresponding value tags in the tagging data structure 126 in the concept object 122.

At block 1006, the fact tags are associated with the category tag. Once again, this association is accomplished via the tagging data structure 126 in the concept object 122. The association of the name and value tags (block 1004(3)), which form the fact tags, and the association of the fact tags and category tags (block 1006) creates a non-flat dimensional tagging structure that affords enhanced navigation, search, and item comparison.

At block 1008, the category and fact tags are presented to a user to assist in navigation through the item encyclopedia, as well as comparison of items. As shown in the example of FIG. 4, the category tags are placed in a category screen section 410 and the fact tags are displayed in a fact screen section 412. The tags are presented as active links (i.e., via underlining or coloration) which can be selected by the user. Users can select any of the category or fact tags to navigate to other pages. Further, the user can compare items based on a selected category or fact tag.

FIG. 11 shows a process 1100 for facilitating comparison of items via the tags. As noted in the diagram, the process 1100 is initiated when a user actuates a compare feature for a particular tag to be compared. In the described implementation, the comparison is being conducted based on a category tag. Such a comparison might be initiated, for example, in response to user selection of the "compare" control 422 next to the category tag "digital camera" to compare various digital cameras. It is noted, however, that the compare control may be located in other regions of the screen and further, that other UI mechanisms may be employed to initiate a comparison.

For purposes of explanation, the process 1100 is described as being implemented by the comparator engine 128 shown in FIGS. 1 and 9. Also, an example is shown along side the various operations to help illustrate some of the computations made by the comparator engine 128.

At block 1102, in response to the user seeking to compare items with the same category tag, the concepts having the category tag which has been selected for comparison are found. With reference to the FIG. 9 implementation, the concept finder 930 searches the concept store 124 for concepts having the selected category tag. Supposing the category is "digital camera", the concept finder 930 locates the concepts 122 with a category tag of "digital camera" in the tagging data structure 126.

At block 1104, fact tags from the identified concepts are then gathered. These fact tags are extracted from the tagging data structure 126 of each concept having the selected category tag. A concept 122(A) for the "Olympus Stylus 800" brand digital camera might, for example, include fact tags for pixel count, weight, zoom features, weatherproof, and so on, as presented in the fact section 412 of the article page 400 in FIG. 4. Concepts for other cameras may have different collections of fact tags, where some of the fact tags are common to multiple concepts and some are not. In FIG. 11, another concept 122(Z) may include fact tags for pixel count, zoom features, and weatherproof, but not for weight.

At block 1106, the fact tags may be optionally ordered according to some predefined criteria. As an example implementation, the ranking engine 932 ranks the fact tags based on how many concepts contain the fact tags (known as "coverage"), and how prominent the fact tags are for a given item based on the their order assigned initially by the author or community (known as "position"). For purposes of illustration, suppose that the concept finder 930 locates three concepts with the category tag "digital camera", and that these concepts have the fact tags shown in Table 1:

TABLE 1

| Concept 1: Olympus | Concept 2: Canon | Concept 3: Nikon |
|---|---|---|
| Category Tag: | Category Tag: | Category Tag: |
| Digital Camera | Digital Camera | Digital Camera |
| Fact Tags: | Fact Tags: | Fact Tags: |
| Resolution | Zoom | Resolution |
| Zoom | Resolution | Zoom |

TABLE 1-continued

| Concept 1: Olympus | Concept 2: Canon | Concept 3: Nikon |
|---|---|---|
| Weight | Weatherproof | Weight |
| Weatherproof | | |

Notice that the fact tags with name tags of "resolution" and "zoom" belong to all three concepts. This indicates that more people felt these facts were important when evaluating the item. The fact tags with name tags of "weight" and "weatherproof" are common to only two of the three concepts. Thus, generally, the ranking engine 932 will give higher priority to the fact tags pertaining to pixel count and zoom capabilities because they are common to more concepts than the fact tags about weight and weatherproofing.

Ordering the fact tags may be viewed as a series of sub-operations 1106(1)-1106(3). At 1106(1), coverage of the fact tags is calculated. As one possible technique, the ranking engine 932 computes the percentage of concepts that contain each of the fact tags, as follows:

Coverage=Number of Concepts with Fact Tag/Total Number of Concepts

So, for each of the fact tags with name tags of "resolution" and "zoom", the coverage is 100% because all three concepts contain these tags. In contrast, the coverage for each of the fact tags with name tags of "weight" and "weatherproof" is 66% because only two of three concepts contain these tags.

At 1106(2), the average position of each fact tag is calculated. One technique to compute average position is to sum the position numbers of the fact tag within each concept, and then divide that sum by the total number of concepts that contain the fact tag, as follows:

Avg Position=Sum of Fact Tag Positions within Concepts/Total Number of Concepts with Fact Tag From table 1 above, the fact tag for "resolution" is listed first in two concepts and second in the third concept. Thus, the average position for this fact tag is 4/3 or 1.33 (i.e., (1+1+2)/3). For the fact tag for "zoom", the average position is 5/3 or 1.67 (i.e., (1+2+2)/3). Similarly, the average positions for the fact tags of "weight" and "weatherproof" are 6/2 or 3 (i.e., (3+3)/2) and 7/2 or 3.5 (i.e., (3+4)/2), respectively.

At 1106(3), a ranking of the fact tags is computed. One approach is to multiple the coverage by the inverse of the position, or:

Rank=Coverage×(1/Avg Position)=Coverage/Avg Position

Table 2 shows the ranks for the four example fact tags.

TABLE 2

| Fact Tags: | Coverage × (1/Avg Position) | Rank |
|---|---|---|
| Resolution | 100% × 3/4 | 0.75 |
| Zoom | 100% × 3/5 | 0.60 |
| Weight | 66% × 1/3 | 0.22 |
| Weatherproof | 66% × 1/3.5 | 0.19 |

In this example, the ranking engine would rank the fact tags in the following order: resolution, zoom, weight, and weatherproof. Table 1108 in FIG. 11 summarizes the ordering operation 1106.

At block 1110, the comparison results are presented to the user. Generally, the presentation aligns the facts with one another in a graphical layout so that the user can easily compare the attributes of the various items. In one implementation, the presentation layout engine 934 arranges the fact tags into a table format. One example layout is illustrated in the comparison page 500 of FIG. 5, with a miniaturized representation shown in FIG. 11. In this example, the name tags are placed as column headings in the table. The associated value tags are then placed in appropriate table cells vertically beneath the corresponding name tags and horizontally across from the item to which the value tag applies. Notice also that the fact tags may be optionally displayed according to their computed ranking. In FIG. 5, the fact tags are arranged in the comparison table in the order of "resolution", "zoom", "weight", and "weatherproof", thereby lending more prominence to fact tags about resolution as compared to the fact tags about weight and whether the camera is weatherproof.

As noted above, in the type of community described herein, where numerous different users may contribute subject matter to the community, the contributions from the different users may use different vocabularies. Put differently, these contributions may exhibit divergence. The preceding description provided at least one non-limiting example of divergence, in which one user enters the fact name "Weight" and another user enters the fact name "Bulk." In some instances, community usage may drive the vocabularies to some common terminology in a reasonable amount of time. In other instances, for any number of reasons, community usage may not drive the vocabularies to common terminology quickly, if at all. In these latter scenarios, automated tools and techniques for achieving convergence of terms within the collaborative tagging environment may be useful. Such tools and techniques are now described, beginning with the description of FIG. 12 and the following drawings.

Figure 12:
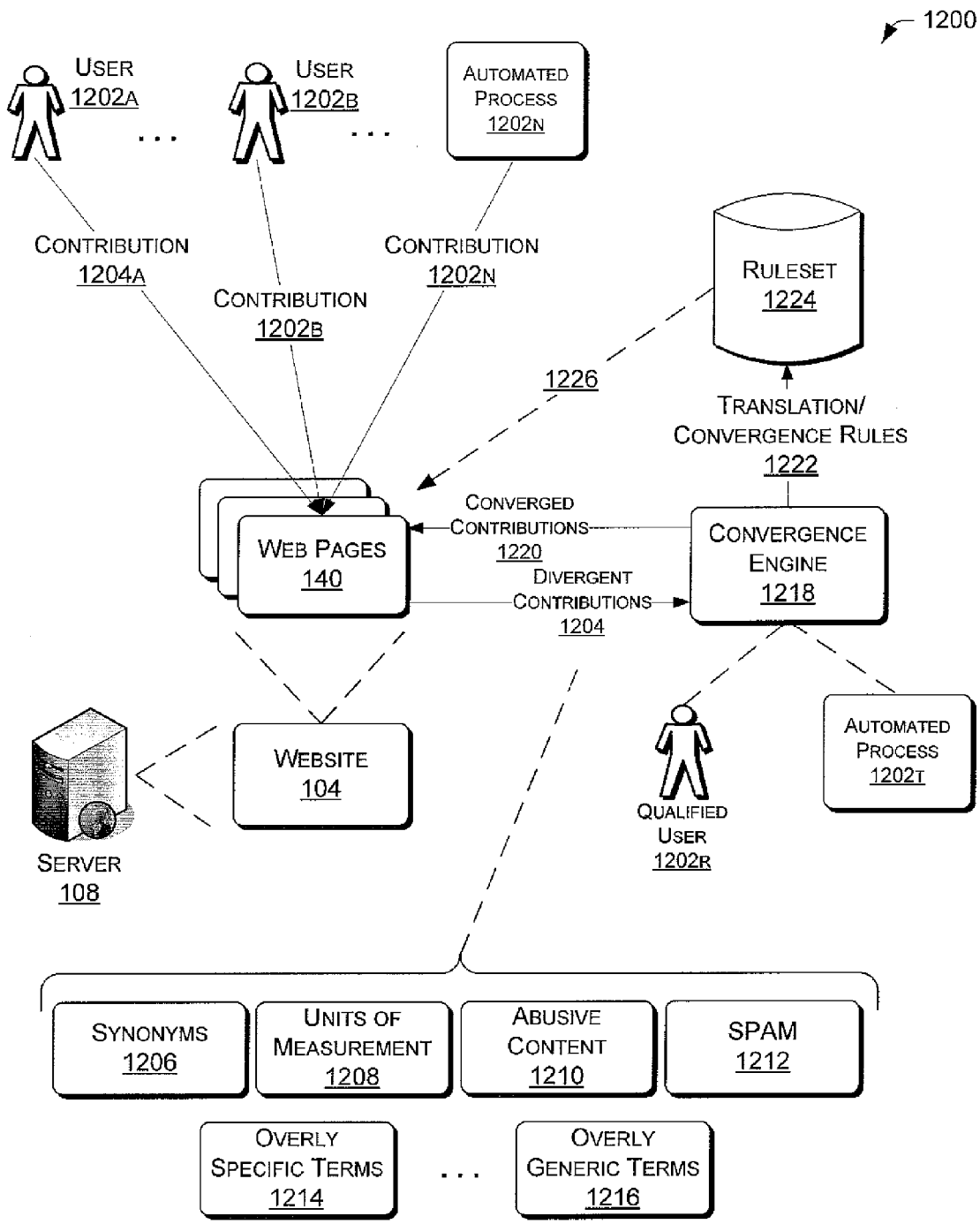
FIG. 12 is a block diagram of an example architecture for implementing convergence of terms within a collaborative tagging environment.

FIG. 12 illustrates an example architecture 1200 for implementing convergence of terms within a collaborative tagging environment. Components illustrated and described previously are carried forward to this Figure, and to other Figures below, only for convenience, but not limitation. Such components are denoted by identical reference numerals.

As shown in FIG. 12, a representative server 108 may host a website 104, which in turn may include one or more web pages 140. FIG. 12 shows a plurality of web pages 140 for convenience. A plurality of contributors 1202 may provide subject matter for posting on the web pages. For convenience only, FIG. 12 shows two human users 1202A and 1202B, and an automated process 1202N, who may contribute subject matter. However, the architecture 1200 may support any number of contributors 1202. These contributors may be associated with respective user computing devices, such as those shown in FIG. 1 at 102, and the description of these user computing devices and related components (e.g., processors 130, memory 132, and browser 134) apply equally to FIG. 12. For example, the human users 1202A and 1202B may view the web pages 140 using the browsers 134.

The contributions to the web pages from the various contributors 1202 are denoted respectively at 1204A, 1204B, and 1204N (collectively, contributions 1204). These contributions may exhibit some level of divergence, and are thus denoted in FIG. 12 as divergent contributions 1204.

FIG. 12 shows examples of different types of divergent contributions, now described in detail. It is noted that FIG. 12 provides these examples only for ease of description, but not for limitation. The architecture 1200 may readily process other examples or types of divergent contributions without departing from the scope and spirit of the description herein.

Block 1206 represents divergence resulting from the use of numerous synonyms that convey similar meanings. Recall the example from above of using "weight" versus "bulk" for fact tags. It is noted that the users 1202 may use synonyms for category tags, fact tags, and name tags. As detailed further below, the architecture 1200 may converge these synonyms to one or more common terms to, for example, facilitate organizing and searching these tags.

In the context of, for example, media, publications, or other works, examples of synonyms may include occurrences of multiple titles for successive publications of a given work. Synonyms may also include the titles of sequels or prequels of a given work. In any of these instances, any tags including these different titles may be collapsed to one title, to ease organizing and searching these tags.

Block 1208 represents divergence resulting from different contributions specifying parameters in different units of measurement. For example, returning to the "weight" example from above, some users may specify weights, lengths, or volumes in metric units, while other users may specify these parameters in English units. As detailed further below, the architecture 1200 may converge these disparate units of measurement to some common system of measurement units to, for example, enable comparison of different quantities on a consistent and more uniform basis.

Block 1210 represents divergence in the form of abusive, profane, or otherwise improper subject matter appearing in the contributions. This type of subject matter may offend the users personally, as well as undermining the utility of the web pages. As detailed further below, the architecture 1200 may identify such abusive subject matter, remove it from the web pages, and reduce the risk of users posting such subject matter again.

Block 1212 represents divergence resulting from the users posting SPAM or other unsolicited and unwanted content on the web pages. Like the abusive subject matter represented in block 1210, SPAM may distract users from otherwise valid content posted on the web pages, and may consume excessive storage resources on the server 108. As detailed further below, the architecture 1200 may identify SPAM or similar subject matter, remove it from the web pages, and reduce the risk of users posting such subject matter again.

Block 1214 represents divergence resulting from contributions that employ descriptive terms that are more specific than appropriate in the context of the web pages 140. For example, one user might describe a given color as "red," while another user may describe the same color as "burgundy," while yet another user may describe that color as "crimson." Assuming a basic designation of "red" would suffice for the purposes of the web pages, the other descriptions of shades of red are overly specific, and may hinder categorization of these contributions. As detailed further below, the architecture 1200 may identify such instances of excessive specificity in the contributions 1204, and generalize these instances to facilitate organization of these contributions.

Block 1216 represents divergence resulting from the contributions containing possibly confusing or unclear comparisons. This confusion or lack of clarity may result from contributions that provide, for example, overly general or generic comparisons. For example, users may post a contribution indicating that Camera A is "better" or "worse" than Camera B, but without providing any objective or specific factors that support these opinions. More generally, block 1216 represents one or more contributions that provide comparisons that are expressed in incompatible levels of granularity.

The architecture 1200 may provide a convergence engine 1218, which may be implemented as one or more software modules executing on suitable hardware. As detailed further below in FIG. 13, one or more suitable qualified or trusted human users 1202R may use the convergence engine 1218 as an interactive tool to converge the divergent contributions 1204 into converged contributions 1220 at approximately the same time that the contributions are received. These qualified users 1202R may be trusted to access more functions of the convergence engine 1218, on behalf of the community. In other implementations, the convergence engine 1218 may operate on contributions to the web pages well after the contributions are entered. Additionally, one or more automated processes 1202T may interact with the convergence engine 1218 to perform similar functions.

The converged contributions may be viewed as another version of the incoming divergent contributions, but processed as described herein to achieve some level of convergence. Recalling FIG. 8 and related description of the history tab 706 shown in the web page 800, the converged contributions may be stored as a subsequent version of the divergent contributions.

In general, while the contributions may be considered divergent for any of the reasons described herein, these divergent contributions may be nevertheless related to one another to some degree. This degree of relation may, in some sense, enable the convergence operations described herein.

Additionally, the convergence engine 1218 may generate as output a set of rules 1222 that specify translations, edits, or other alterations performed to drive the divergent contributions to convergence. These convergence rules may be stored in a ruleset store 1224 for execution on the web pages 140 as a whole, as denoted by the dashed line 1226. For example, one of the users may execute the convergence engine to converge some aspect of the contributions on a particular web page 140. Afterwards, the convergence engine may load one or more suitable rules 1222 into the ruleset store 1224. By executing the rules 1222 against the rest of the web pages, the convergence rules provided by the user may be propagated across multiple web pages, beyond the one web page that the user edited.

In describing the rules 1222 and the ruleset 1224, it is noted that rules within the ruleset may be modified or deleted by, for example, the qualified user 1202R and/or the automated process 1202T. Additionally, one or more of these entities may add further rules as appropriate.

It is also noted that in running the rules against a plurality of different web pages, as represented generally at 1226, that conflicts may arise. For example, one qualified user may add a rule that converges the term "flute" to "musical instrument". For some web pages, this rule may be appropriate. However, other web pages may use the term "flute" to refer to a champagne class. In these other web pages, application of the example rule may produce incongruous results. A second qualified user, or the original qualified user, may recognize this conflict, and resolve the conflict by, for example, modifying the original rule, or limiting the scope of its application.

In describing the architecture 1200, it is noted that the contributions 1204 may be provided, converged, and accessed in any number of different environments. Examples of such environments may include, but are not limited to, desktop environments and mobile environments. In these different environments, the devices and components used to perform the functions described herein may vary. For example, the web site 104 as denoted above may be generalized to any resource accessible over a network (i.e., a network resource), and the web pages 140 may be generalized to any format suitable for presentation on display screens of, for example, mobile devices having wireless communications capability.

Figure 13:
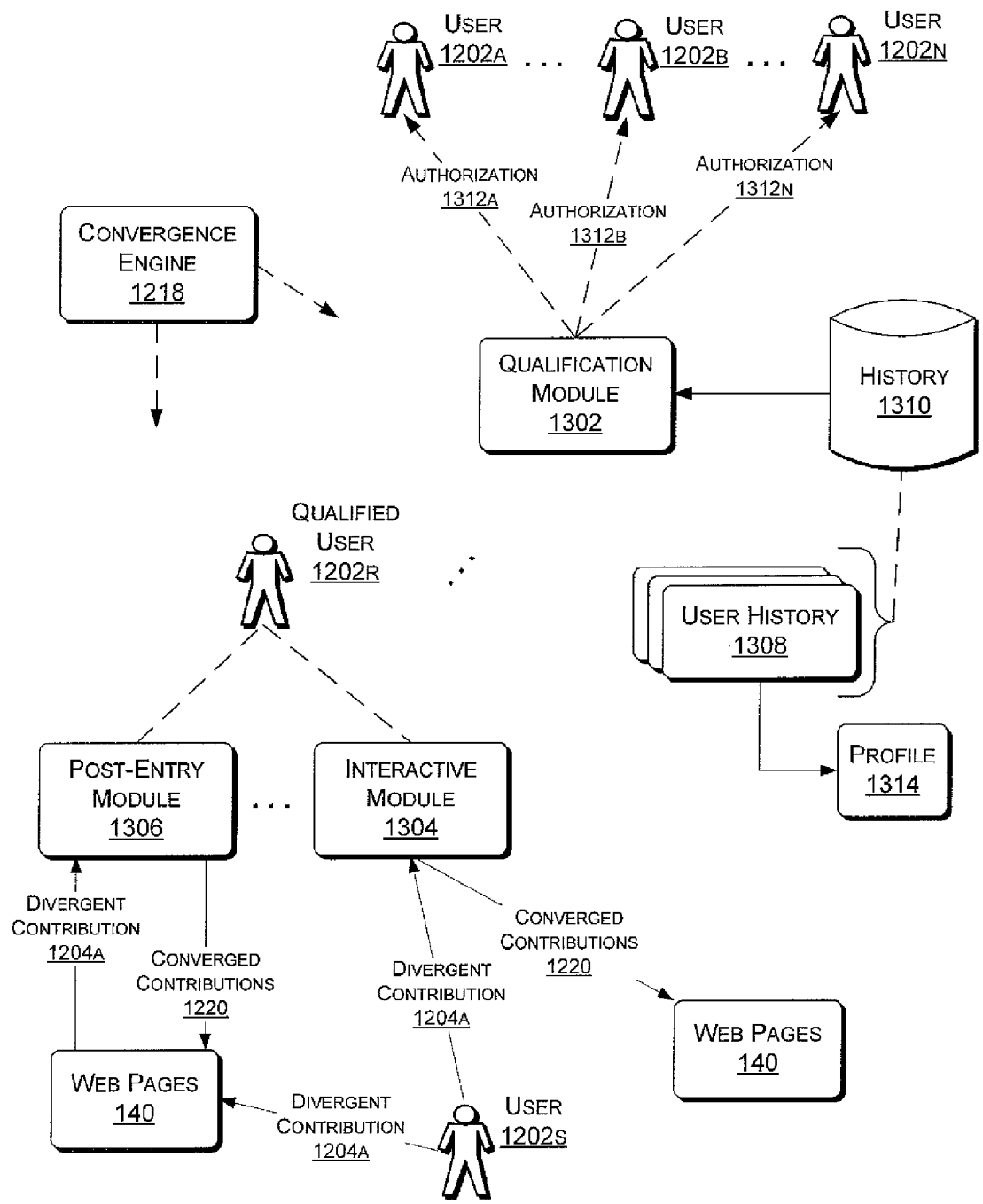
FIG. 13 is a block diagram that illustrates further components and data flows related to a convergence engine, as shown in FIG. 12.

Having described the architecture 1200 above in FIG. 12, the discussion now proceeds to a more detailed description of the convergence engine 1218, now presented with FIG. 13.

FIG. 13 illustrates further components and data flows related to the convergence engine 1218. The convergence engine may include components such as a qualification module 1302, an interactive module 1304, and a post-entry module 1306. These modules are now described in turn.

The qualification module 1302 operates generally to authorize various users 1202 to access the convergence engine. In a representative implementation, different users may receive different levels of access to the functions of the convergence engine. Some users may be denied access to the convergence engine until they qualify. Other users may receive access to some functions of the convergence engine, but not to all functions until they qualify further. Finally, some users may receive full access to all functions of the convergence engine.

The qualification module may access user history records 1308 from a history database 1310. The various users 1202 may be associated with respective user history records as stored in the history database. These user history records may contain data indicating past actions performed by the users. These actions may include, for example, positive aspects, such as contributing content or subject matter to one or more of the web pages 140, editing or correcting content posted on the web pages, serving as a subject matter expert on some topic posted on the web pages, or the like. In a more negative sense, these actions may include posting abusive or inappropriate subject matter on the web pages, posting SPAM or other unsolicited advertisements on the web pages, or the like. In any event, the history database may indicate the history of particular users 1202.

In possible operational examples, assuming that the user 1202A is a new user, this user's history record may be empty or nonexistent. In this case, the qualification module may allow the user 1202A only to post contributions to the web pages, or to manually edit contributions made only to one web page, for example. In general, the level of authorization extended by the qualification module to the user 1202A is denoted at 1312A.

If the user 1202B is a moderately experienced user, this user's history record may so indicate. In this case, the user 1202B may be permitted to use some of the automated functions of the convergence engine 1218 on, for example, a given web page, but not universally on all web pages maintained by the website. The authorization level of the user 1202B is denoted at 1312B.

If the user 1202N is a highly experienced user, this user's history record may so indicate. In this case, the user 1202N may be permitted to use all the functions of the convergence engine 1218 on, for example, all web pages maintained by the website. The authorization level of the user 1202N is denoted at 1312N.

The qualification module may establish a profiling system used to distinguish and qualify the various levels of users 1202. The records 1308 may store respective profiles 1314 with different given users. These profiles may indicate the quantity and/or quality of the users' contributions over time, and may enable multiple dimensions of measurement or evaluation. For example, a user may be able to perform a variety of different actions to contribute to the community as a whole. These actions may be evaluated and weighted differently, depending on, for example, strengths or weakness of particularly contributors, or the value of those actions to the community as a whole. For example, a contributor may be awarded a certain number of points for posting content, and a certain number of points for editing content, and the like. The number of points earned for these different tasks may be chosen according to the value associated with these tasks. For example, assuming that a well-edited entry adds considerable value to the community as a whole, as compared to just posting content, then the points awarded for well-done edits may so reflect. Over time, the profiles 1314 may indicate which users or contributors may be authorized, qualified, or trusted to assume more responsibility.

The interactive module 1304 enables suitably qualified users, denoted at 1202R, to use the convergence engine to receive and edit divergent contributions 1204A as submitted by users 1202S. More specifically, the interactive module 1304 enables the qualified users 1202R to drive the divergent contributions to convergence on an interactive basis, before these contributions are posted on the web pages. In implementations using the interactive module of the convergence engine, the web pages may not host the divergent contributions 1204, but instead would host only the converged contributions 1220. Put differently, the interactive module enables the qualified users to intercept the divergent contributions before they are posted, and to converge these contributions before posting.

The post-entry module 1306 enables suitably qualified users, denoted also for convenience at 1202R, to use the convergence engine 1218 to process divergent contributions 1204 that have already been posted on the web pages 140, drive them to convergence, and to post the converged contributions onto the web pages as, for example, new or updated versions. The post-entry module differs from the interactive module in that the former converges content after posting on the web pages, while the latter converges content before posting on the web pages.

Figure 14:
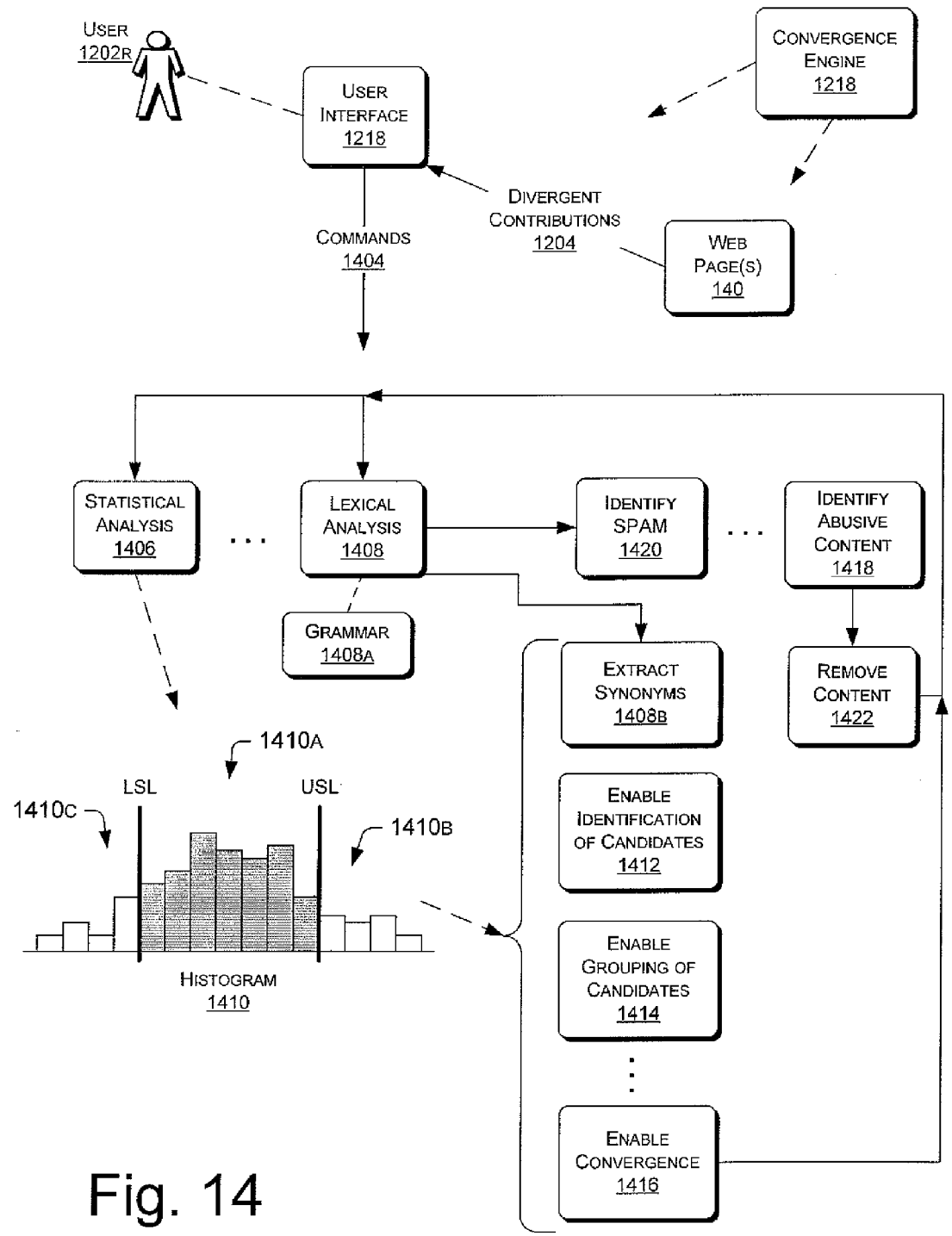
FIG. 14 is a block diagram of a user interface and related components related to the convergence engine.

Having described the components and data flows related to the convergence engine in FIG. 13, the discussion now turns to a description of a user interface and related components, now presented in FIG. 14.

FIG. 14 illustrates a user interface and related components related to the convergence engine as shown in previous drawings. For convenience but not limitation, some components and elements described previously are carried forward into FIG. 14, and are denoted by identical reference numerals.

As shown in FIG. 14, the convergence engine may expose or surface a user interface 1402 with which, for example, the user 1202R may interact. Recall that the user 1202R and/or an automated process 1202T may assume the role of editing or otherwise causing the divergent contributions (e.g., 1204) to achieve to some level of convergence in terminology. These divergent contributions may have already been posted on the web pages 140, or may have been contributed for posting, but not yet posted.

In any event, the user 1202R may provide one or more commands 1404 through the user interface related to converging the divergent contributions. For ease of discussion, but not limitation, these commands may relate generally to performing statistical analysis on the divergent contributions, as represented in block 1406. These commands may also relate to performing a lexical analysis on the divergent contributions, as represented in block 1408.

Turning first to the statistical analysis, this analysis of the divergent contributions may generate a histogram 1410. The histogram may represent what a statistically most probable distribution of items occurring within the divergent contributions. Thus, the histogram may provide a graphical tool that enables the user 1202R to visualize the distribution of different terms that occur in a given sample of the divergent contributions, and to visualize the frequency with which these different terms occur. Given this visual tool, the user 1202R may readily identify those terms that most frequently occur, denoted at 1410A, as well as those terms that may be considered statistical outliers that occur only infrequently, as denoted at 1410B and 1410C.

Terms that occur in the outlier regions 1410B and 1410C may include overly specific terms that may just as well be represented by more general, more frequently-occurring terms that occur in the central region 1410A. Recall, for example, the discussion of block 1214 in FIG. 12, and the example of the term "red" versus the more specific terms "burgundy" and "crimson."

In another example, the outlier terms may include synonyms that occur less frequently than other terms that occur within the central region 1410A. Recall, for example, the discussion of block 1206 in FIG. 12, and the example of one user expressing the mass of a camera in terms of "weight," and another user expressing the mass of the camera in terms of "bulk." Assuming that different users express some general concept, such as the mass of an object, with two or more different synonyms, then is may be likely that different instances of these synonyms may occur in the outlier regions 141013 and 1410C, rather than the central region 1410A.

In another example, the outlier terms may include quantities expressed in different terms of measurement. Recall, for example, the discussion of block 1208 in FIG. 12, and the discussion of expressing quantities in Metric units versus English units. If sufficient numbers of users choose different units to express these quantities, then at least some of these divergent contributions from those users may fall into the outlier regions 1410B and 1410C, rather than the central region 1410A.

In any event, the visual tool provided by the histogram may enable the user 1202R to generate commands that perform several functions, with FIG. 14 showing several non-limiting examples of such functions. Block 1412 represents enabling the user 1202R to identify candidate terms within the divergent contributions for convergence. These candidate terms may include terms occurring in the outlier regions 1410B and 1410C of the histogram. These terms may be relatively infrequently occurring instances of synonyms, units of measurement, overly specific terms, or the like.

Block 1414 represents enabling the user 1202R to group or select the candidate terms identified in block 1412. For example, block 1414 may include enabling the user 1202R to check a plurality of box representations that the user interface provides for the terms, enabling the user 1202R to perform shift-and-click operations to select a group of terms, or the like.

Block 1416 represents enabling the user 1202R to converge the grouped or selected terms to one or more common or uniform terms. Block 1416 thus may include enabling the user 1202R to specify the one or more common or uniform terms to which the grouped or selected terms are to be converged.

Recall the above example of using the term "red" versus the terms "burgundy" and "crimson." Block 1412 may include enabling the user 1202R to identify the overly-specific terms "burgundy" and "crimson" as candidates to the suitable term "red." Block 1414 may include enabling the user 1202R to select graphic representations of the terms "burgundy" and "crimson," as presented in the histogram. Block 1416 may include enabling the user 1202R to select a graphic representation of the term "red" in the histogram, or to key-in or otherwise provide the term "red," as the term to which "burgundy" and "crimson" are to be converged.

After performing at least block 1416, the user interface may return to block 1406 to repeat the statistical analysis of the divergent contributions, as now converged in block 1416.

The convergence engine may calculate an updated histogram 1410 that reflects the state of the divergent contributions after the convergence represented in block 1416. The foregoing processes, may be repeated until the divergent contributions reach an appropriate state of convergence. As these processes are repeated, different terms may be pushed out into the outlier regions 1410B and 1410C, and the user 1202R can then visualize and process these terms as described above.

Turning to the lexical analysis in block 1408, the lexical analysis may operate using, for example, a grammar 1408A that defines an expected structure for the contributions. Using this grammar, the lexical analysis may identify contributions that contain synonyms appearing at particular places in the grammar, as represented generally at block 1408B. Once these synonyms are identified, they can be processed as described above in blocks 1412-1416.

The statistical and/or lexical analyses may be useful for identifying abusive content, as represented in block 1418, and for identifying SPAM, as represented in block 1420. The lexical analysis may include loading one or more grammars or finite state machines (e.g., 1408A) that represent valid or acceptable contributions from the users. The lexical analysis may include running the divergent contributions through these grammars and/or state machines to assess the validity of the divergent contributions. The grammars and/or state machines may indicate or flag certain portions of the divergent contributions as non-compliant, and bring these portions to the attention of the user 1202R through the user interface 1402. In this manner, the lexical analysis may enable the user 1202R to remove any non-compliant subject matter, as represented in block 1422.

After performing block 1422, or block 1416 as discussed above, the convergence engine may return to block 1406 or 1408 and repeat the processing described above, as represented by the arrows leaving blocks 1422 and 1416. For example, after performing lexical analysis to remove any non-compliant terms or other subject matter, the convergence engine may perform statistical analysis, and vice versa.

Figure 15:
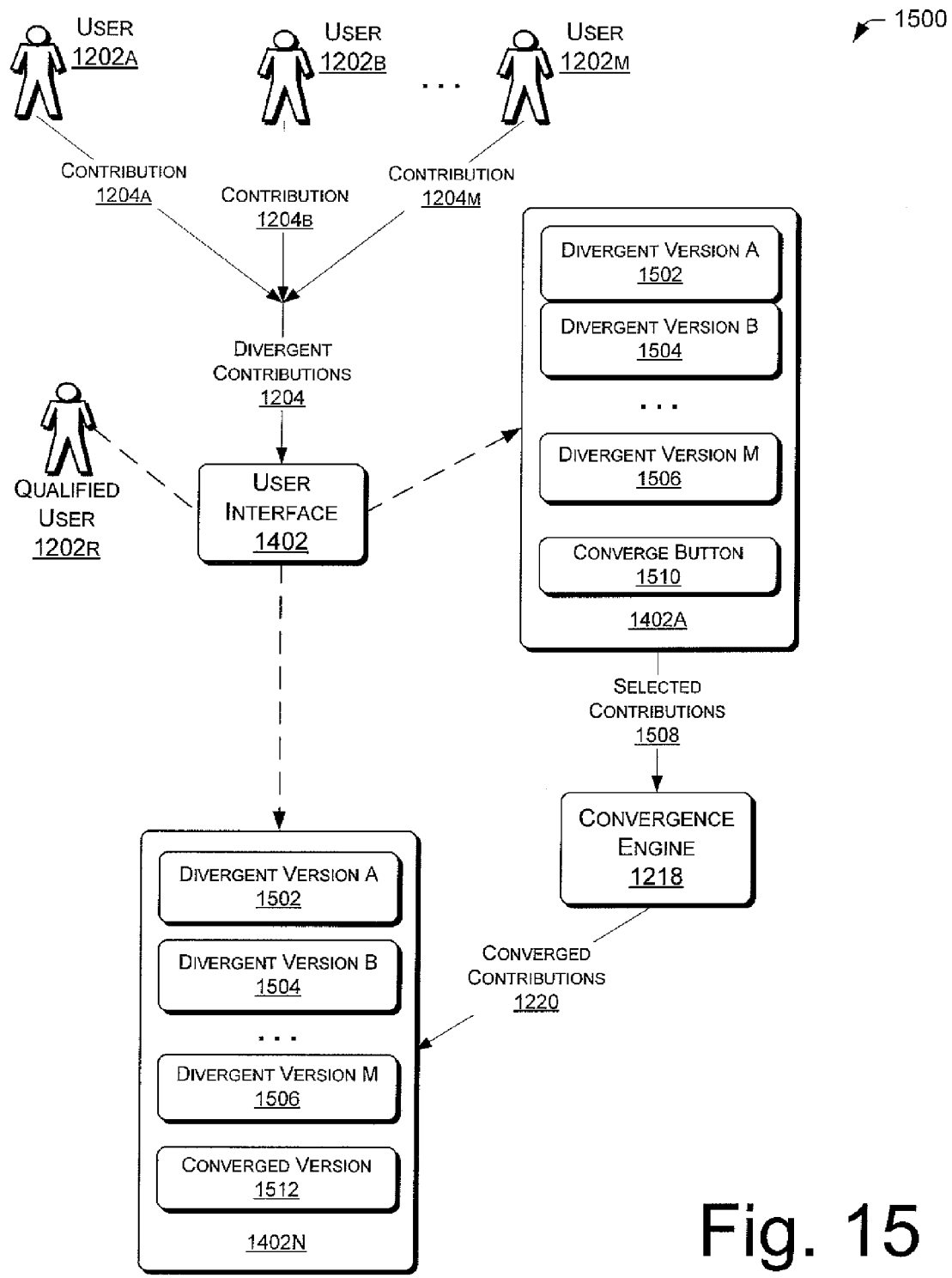
FIG. 15 is a block diagram of an operating environment featuring various states of a user interface, as divergent versions of the contributions are received and converged.

FIG. 15 illustrates an operating environment 1500 featuring various states of a user interface, as divergent versions of the contributions 1204 to the web page are received and converged. As shown in FIG. 15, the users 1202A, 1202B, and 1202M provide respective convergent contributions 1204A, 1204B, and 1204M (collectively, convergent contributions 1204).

In an initial state, denoted at 1402A, the interface may depict representations of the different versions of the divergent contributions 1204. For example, a first field 1502 depicts the contribution from the user 1202A, a second field 1504 depicts the contribution from the user 1202B, and a third field 1506 depicts the contribution from the user 1202M. The qualified user may select one or more of the fields 1502-1506 for convergence. FIG. 15 denotes the selected contributions generally at 1508.

The interface 1402A may also include a button or other similar device 1510 that is responsive to user input to initiate the process of converging the selected contributions 1508. The interface 1402A may also include a button or other similar device 1508 that is responsive to user input to initiate the process of converging the contents of one or more of the fields 1502-1506.

The qualified user 1202R may employ the convergence engine 1218 to process these different contributions, using for example, the description provided above in FIGS. 12-14. The convergence engine may converge the selected contributions 1508, producing the converged contributions 1220 as output. Afterwards, the user interface 1402 may present these converged contributions 1220, as denoted generally at 1402N. As indicated in the example shown in FIG. 15, the user interface 1402N may include the fields 1502-1506 for the divergent contributions, as well as a field 1512 containing the converged contributions 1220 for presentation to the user 1202R.

Figure 16:
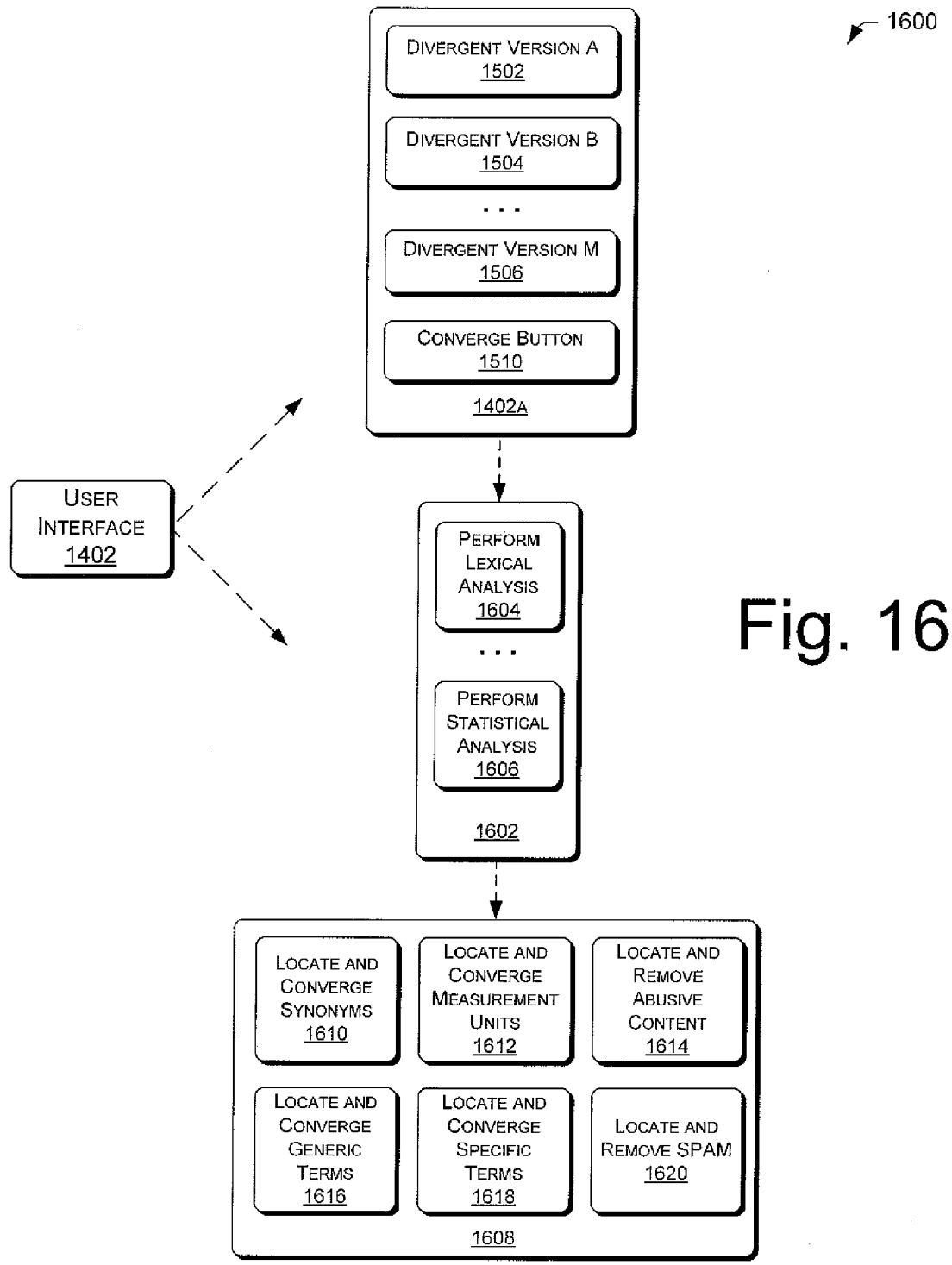
FIG. 16 is a block diagram of a user interface, presenting different buttons or other devices that are responsive to user input to perform the various functions shown, for example, in FIG. 14.

FIG. 16 illustrates different aspects of the user interface 1402, presenting different buttons or other devices that are responsive to user input to perform the various functions shown in FIG. 14. More specifically, FIG. 16 illustrates versions of the user interface 1402 that may be presented to the user in response to the user selecting the converge button 1510. For convenience, but not limitation, the user interface 1402A and related fields are carried forward from FIG. 16.

In response to the user selecting the converge button 1510, the user interface 1402 may present a form 1602. This form 1602 may include respective buttons 1604 and 1606, which correspond to performing the lexical analysis and the statistical analysis as described above. The user 1202R may select to perform one or more of these analyses by activating the appropriate button.

In response to the user selecting one of the buttons 1604 or 1606, the user interface 1402 may present a form 1608. This form 1608 may include respective buttons by which the user may initiate any the examples of convergence operations described herein. For example, a button 1610 may initiate the process of locating and converging synonyms. A button 1612 may initiate the process of locating and converging inconsistent measurement units. A button 1614 may initiate the process of locating and removing abusive content. A button 1616 may initiate the process of locating and converging overly generic terms. A button 1618 may initiate the process of locating and converging overly specific terms. A button 1620 may initiate the process of locating and removing SPAM or other unsolicited materials.

In illustrating and describing the various aspects of these user interfaces, it is noted that implementations of these user interfaces could arrange these elements in different ways without departing from the scope and spirit of the description herein. Additionally, implementations could include buttons or devices other than those shown herein, or may implement any subset of the buttons or devices shown herein.

Conclusion

Although the subject matter has been described in language specific to structural features and/or methodological acts, it is to be understood that the subject matter fined in the appended claims is not necessarily limited to the specific features or acts described. Rather, the specific features and acts are disclosed as exemplary forms of implementing the claims.

What is claimed is:

1. A method for converging terms within a collaborative tagging environment, the method comprising:
   under control of one or more processors of one or more computing devices that are configured with processor-executable instructions,
   receiving, by the one or more processors, terms characterizing an item within the collaborative tagging environment;
   identifying at least some of the terms as divergent terms at least in part by statistically analyzing the terms to identify frequently-occurring terms and infrequently-occurring terms,
   wherein the statistical analysis comprises generating a histogram representation of frequently-occurring terms and infrequently-occurring terms to enable at least one user to visualize a distribution and a frequency of candidate terms within the divergent terms, and enabling at least one user to group a plurality of identified candidate terms within the divergent terms for convergence to at least one frequently-occurring term;

converging, in response to a user input, the candidate terms within the divergent terms into one of the identified frequently-occurring terms; and at least partly in response to the converging, assigning the one of the identified frequently-occurring terms to the item in lieu of each of the divergent terms to facilitate searching for the item.

2. The method of claim 1, wherein receiving terms includes receiving the terms from at least one human user.

3. The method of claim 1, wherein receiving terms includes receiving the terms from at least one automated process.

4. The method of claim 1, further comprising loading the divergent terms into at least one server provided in connection with a network resource.

5. The method of claim 4, wherein the server is for serving at least one web page, and wherein the network resource is a website.

6. The method of claim 4, further comprising retrieving the divergent terms from the server before enabling at least one qualified user to converge the divergent terms.

7. The method of claim 1, further comprising loading converged versions of the divergent terms onto the server.

8. The method of claim 4, wherein converging the candidate terms within the divergent terms is performed before loading the divergent terms onto the server.

9. The method of claim 1, further comprising generating at least one rule to perform the converging of the divergent terms in a website.

10. The method of claim 1, further comprising qualifying at least one user to converge the divergent terms.

11. The method of claim 1, further comprising qualifying at least one of the users to use an automated convergence engine to converge the divergent terms.

12. The method of claim 1, further comprising qualifying at least one user to use at least one feature of an automated convergence engine to converge the divergent terms.

13. The method of claim 1, wherein identifying at least some of the terms as divergent terms includes identifying at least one term within the divergent terms as being a synonym of another term.

14. The method of claim 1, wherein identifying at least some of the terms as divergent terms includes identifying at least one term within the divergent terms as being a more specific counterpart of another term within the divergent terms.

15. The method of claim 1, wherein identifying at least some of the terms as divergent terms includes identifying at least one term within the divergent terms as being expressed in a different unit of measurement.

16. The method of claim 1, wherein identifying at least some of the terms as divergent terms includes identifying at least one terms within the divergent terms as being abusive.

17. The method of claim 1, wherein identifying at least some of the terms as divergent terms includes identifying at least one term as expressing an incomplete comparison.

18. The method of claim 1, wherein identifying at least some of the terms as divergent terms includes lexically analyzing the terms.

19. A method for qualifying at least one of a plurality of users to use an automated convergence engine, the method comprising:

under control of one or more processors of one or more computing devices configured with processors-executable instructions, accessing, by the one or more processors, a plurality of records relating to the users, wherein the records indicate past activities performed by the users;

analyzing the activities performed by the users, wherein the analyzing includes:

establishing a profile system applicable to the users;

awarding a first number of points for contributing content to a collaborative tagging environment; and awarding a second number of points for editing content contributed to the collaborative tagging environment;

authorizing at least one of the users to access the convergence engine to converge one or more terms assigned to an item within a collaborative tagging environment into a single frequently-occurring term to be assigned to the item and used to locate the item in lieu of each of the terms; and automatically converging additional terms into the single frequently-occurring term to facilitate searching for the item.

20. The method of claim 19, wherein the second number of points is greater than the first number of points.

21. The method of claim 19, wherein authorizing at least one of the users is based at least in part on how many points the user has earned under the profile system.

22. A system for converging terms within a collaborative tagging environment, the system comprising:

one or more processors;

memory; and an automated convergence engine, stored in the memory and executable on the one or more processors, for converging terms assigned to an item into a single frequently-occurring term within the collaborative tagging environment, the convergence engine comprising:

a qualification module for authorizing at least one user to access at least one of the functions of the convergence engine to converge the terms received from at least a further user within the collaborative tagging environment into the frequently-occurring term, wherein the qualification module:

establishes a profiling system applicable to a plurality of users;

awards a first number of points for contributing content to the collaborative tagging environment; and awards a second number of points for editing content contributed to the collaborative tagging environment;

an interactive module to intercept the terms before the terms are posted onto at least one network resource;

a convergence module for enabling the authorized user to use the convergence engine to converge the intercepted terms into the frequently-occurring term to be assigned to the item and used to locate the item instead of each of the terms; and a post-entry module for enabling the authorized user to retrieve divergent terms as posted on a page, and for enabling the authorized user to converge the divergent terms into the frequently-occurring term, and to post the frequently-occurring term onto the page.

23. The system of claim 22, wherein the second number of points is greater than the first number of points.

24. The system of claim 22, wherein the qualification module, in authorizing the at least one user, is based at least in part on how many points the user has earned under the profiling system.

25. The system of claim 22, wherein the qualification module further authorizes the user to access all of the functions of the convergence engine to converge terms into frequently-occurring terms within a collaborative tagging environment.

26. A system for converging terms within a collaborative tagging environment, the system comprising:
one or more processors;
memory; and
an automated convergence engine, stored in the memory and executable on the one or more processors, for converging terms assigned to an item within the collaborative tagging environment, the convergence engine comprising:
a user interface for receiving respective divergent terms for assignment to the item to the collaborative tagging environment;
an analysis module responsive to commands from the user interface to perform analysis on the respective divergent terms and to converge the respective divergent terms based at least in part on the analysis, wherein the commands comprise:
an identify command to identify candidate terms;
a select command to select candidate terms;
a converge command to converge candidate terms, and
wherein the analysis module comprises:
a statistical analysis module responsive to the commands from the user interface, wherein the statistical analysis module is to:
generate a histogram representation of frequently-occurring terms and infrequently-occurring terms to enable at least one authorized user to visualize a distribution and a frequency of candidate terms within the divergent terms;
enable at least one authorized user to group a plurality of identified candidate terms within the divergent terms for convergence to at least one frequently-occurring term; and
a lexical analysis module responsive to the commands from the user interface to:
perform a lexical analysis on the divergent terms;
converge the divergent terms based at least in part on the analysis; and
wherein the statistical analysis module and the commands provide for convergence to at least one frequently-occurring term to be assigned to the item and used to locate the item instead of each of the divergent terms.

27. The system of claim 26, wherein the user interface is responsive to commands from at least one authorized user to activate the analysis module to process the divergent terms.

28. The system of claim 26, wherein the statistical analysis module is for enabling at least one authorized user to identify at least one frequently-occurring term to which a plurality of grouped terms are to be converged.

29. The system of claim 26, wherein the lexical analysis module is for loading a grammar, and for processing the divergent terms against the grammar.

30. The system of claim 26, wherein the lexical analysis module is for identifying abusive content in the divergent terms.

31. The system of claim 26, wherein the lexical analysis module is for identifying unsolicited content in the divergent terms.

* * * * *